United States Patent
Janarthanam et al.

(10) Patent No.: US 11,551,172 B2
(45) Date of Patent: Jan. 10, 2023

(54) SOLUTION ARCHITECTURE PREDICTION

(71) Applicant: ACCENTURE GLOBAL SOLUTIONS LIMITED, Dublin (IE)

(72) Inventors: Balaji Janarthanam, Chennai (IN); Anil Kumar, Bangalore (IN); Abhishek Patni, Bangalore (IN); Vinu Varghese, Bangalore (IN); Hari Kumar Karnati, Bangalore (IN); Saran Prasad, Nagar (IN); Nirav Jagdish Sampat, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 243 days.

(21) Appl. No.: 16/998,696

(22) Filed: Aug. 20, 2020

(65) Prior Publication Data
US 2022/0012654 A1  Jan. 13, 2022

(30) Foreign Application Priority Data
Jul. 8, 2020 (IN) .............................. 202011029045

(51) Int. Cl.
*G06Q 10/06* (2012.01)
*G06K 9/62* (2022.01)
*G06N 20/00* (2019.01)

(52) U.S. Cl.
CPC ......... *G06Q 10/0633* (2013.01); *G06K 9/623* (2013.01); *G06K 9/6215* (2013.01); *G06K 9/6232* (2013.01); *G06K 9/6262* (2013.01); *G06N 20/00* (2019.01); *G06Q 10/06393* (2013.01)

(58) Field of Classification Search
CPC ....................................................... G06Q 10/06
USPC ....................................................... 705/7.27
See application file for complete search history.

(56) References Cited

U.S. PATENT DOCUMENTS

| | | | |
|---|---|---|---|
| 2005/0114180 A1 | 5/2005 | Ploetz et al. | |
| 2019/0163594 A1 | 5/2019 | Hayden et al. | |
| 2020/0125586 A1* | 4/2020 | Rezaeian | G06N 7/005 |
| 2020/0279180 A1* | 9/2020 | Yu | G06N 5/04 |
| 2020/0364758 A1* | 11/2020 | Dwane | H04M 3/5175 |
| 2021/0064432 A1* | 3/2021 | Benmakrelouf | G06N 3/086 |
| 2021/0103840 A1* | 4/2021 | Kwong | G06Q 10/0631 |

\* cited by examiner

*Primary Examiner* — Nga B Nguyen
(74) *Attorney, Agent, or Firm* — Mannava & Kang, P.C.

(57) ABSTRACT

A system for solution architecture prediction may identify a previous solution from a data source and may create a historical solution evaluation matrix by mapping a plurality of concern categories with the previous solution. The system may identify a plurality of solution components preponderant to deriving a solution associated with the solution architecture prediction and create a potential solution evaluation matrix therefrom. The system may evaluate the historical solution evaluation matrix and the potential solution evaluation matrix to determine a credibility score for each solution comprised therein. Based on the evaluation, a solution prediction data may be generated including a previous solution, a potential solution, and the associated credibility score. A service solution may be selected from the solution prediction data to resolve the solution prediction requirement.

20 Claims, 13 Drawing Sheets

800 →

| Rank | Solution/Tool | Final Score | Conflict Upvote Reason |
|---|---|---|---|
| 1 | Sales Force Sales Cloud | 59 | Already implemented and user base in market is high |
| 2 | Vlocity® | 59 | New CRM in market, though user base is good |
| 3 | Siebel® CRM | 36 | N/A |
| 4 | Oracle® Netsuite CRM | 28 | Recent Implementation |
| 5 | Hubspot® CRM | 28 | 2 Years Old Implementation |

804 → (Rank column)
802 → (Final Score column)
806 → (Conflict Upvote Reason column)

Filter By
Solution/Tool
Final Score
Conflict Upvote Reason

View By:
Top 5
Top 10
Top 20

```
┌─────────────────────────────────────────────────────────────────┐
│ Receiving a solution prediction requirement associated with a   │
│ service provided to a user, the solution prediction requirement │
│ being related to a solution to an issue pertaining to the       │
│ service 1002                                                    │
└─────────────────────────────────────────────────────────────────┘
                                 ▼
┌─────────────────────────────────────────────────────────────────┐
│ Obtaining historical data and infrastructure data pertaining to │
│ processing of the solution prediction requirement from a data   │
│ source, the historical data comprising information regarding a  │
│ previous solution for resolving the issue, and the              │
│ infrastructure data comprising infrastructure information       │
│ associated with processing the solution prediction requirement  │
│ 1004                                                            │
└─────────────────────────────────────────────────────────────────┘
                                 ▼
┌─────────────────────────────────────────────────────────────────┐
│ Implementing an artificial intelligence component to determine  │
│ a requirement fulfillment index for the potential solution      │
│ associated with processing the solution prediction requirement  │
│ to create a historical solution evaluation matrix 1006          │
└─────────────────────────────────────────────────────────────────┘
                                 ▼
┌─────────────────────────────────────────────────────────────────┐
│ Implementing an artificial intelligence model to identify, from │
│ the data source, a plurality of solution components             │
│ preponderant to deriving the solution associated with the       │
│ issue 1008                                                      │
└─────────────────────────────────────────────────────────────────┘
                                 ▼
┌─────────────────────────────────────────────────────────────────┐
│ Implementing an artificial intelligence model to obtain         │
│ solution component data from the data source, the solution      │
│ component data comprising information pertaining to each of     │
│ the plurality of solution components 1010                       │
└─────────────────────────────────────────────────────────────────┘
                                 ▼
┌─────────────────────────────────────────────────────────────────┐
│ Implementing an artificial intelligence model to map solution   │
│ component data with each of a pre-existing plurality of         │
│ solution attributes to determine a performance score            │
│ indicative of a performance of each of the plurality of         │
│ solution components associated with each of the solution        │
│ attributes 1012                                                 │
└─────────────────────────────────────────────────────────────────┘
                                 ▼
```

FIG. 10A

SOLUTION ARCHITECTURE PREDICTION

PRIORITY

The present application claims priority under 35 U.S.C. 119(a)-(d) to Indian patent application number 202011029045, having a filing date of Jul. 8, 2020, the disclosure of which is hereby incorporated by reference in its entirety.

BACKGROUND

With advancements in technology, the importance of optimization of Information Technology Enabled Services (ITES) has been increasing. Such optimizations may include, for example, determining an appropriate architecture for a system performing desired operations, such as delivering an Information Technology (IT) propelled service to clients of an organization. Further, the determination of the appropriate architecture may include an analysis of various available tools, techniques, and technology platforms for providing a corresponding service. The analysis may include the selection of optimal tools and techniques from the available tools, techniques, and technology platforms for providing the service. Additionally, each architecture may require a perspective unique to its operation taking into account various factors such as different industrial sectors, client requirements, organizational infrastructure, and the like.

Available systems for determining an appropriate architecture for providing a service may be cumbersome and may require substantial human intervention, thereby making it prone to errors and non-scalable. Additionally, the available systems may only consider historical data associated with the service, which may include various tools, techniques, and technology platforms that have been utilized by an organization previously. Consequently, the available systems may not consider various other effective tools and techniques that may be available but have not been used previously for providing the service. Therefore, the architecture determined based on presently available systems may not be able to effectively and efficiently benefit from various available tools, techniques, and technology platforms for providing the service. Additionally, the available systems may not be flexible and may fail to accommodate various factors such as different industrial sectors, client requirements, organizational infrastructure, technology trends, and the like. Therefore, a problem with available systems for determining an architecture for providing a service is that may be inefficient, ineffective, rigid, and non-scalable.

Accordingly, there is a requirement to determine an architecture for a service in a manner that may effectively and efficiently consider various available tools, techniques, and technology platforms by leveraging automation technologies such as artificial intelligence. Additionally, there is a requirement to create a platform for developing architecture for providing a service, wherein the platform may cater to different industrial sectors, unique client requirements, changing technology trends, and the like, while taking into account existing the implementation constraints within an organization.

BRIEF DESCRIPTION OF DRAWINGS

FIG. 8 illustrates a solution prediction data generated by the solution architecture prediction system, according to an example embodiment of the present disclosure.

FIGS. 10A and 10B illustrate a process flowchart for solution architecture prediction, according to an example embodiment of the present disclosure.

DETAILED DESCRIPTION

Figure 1:
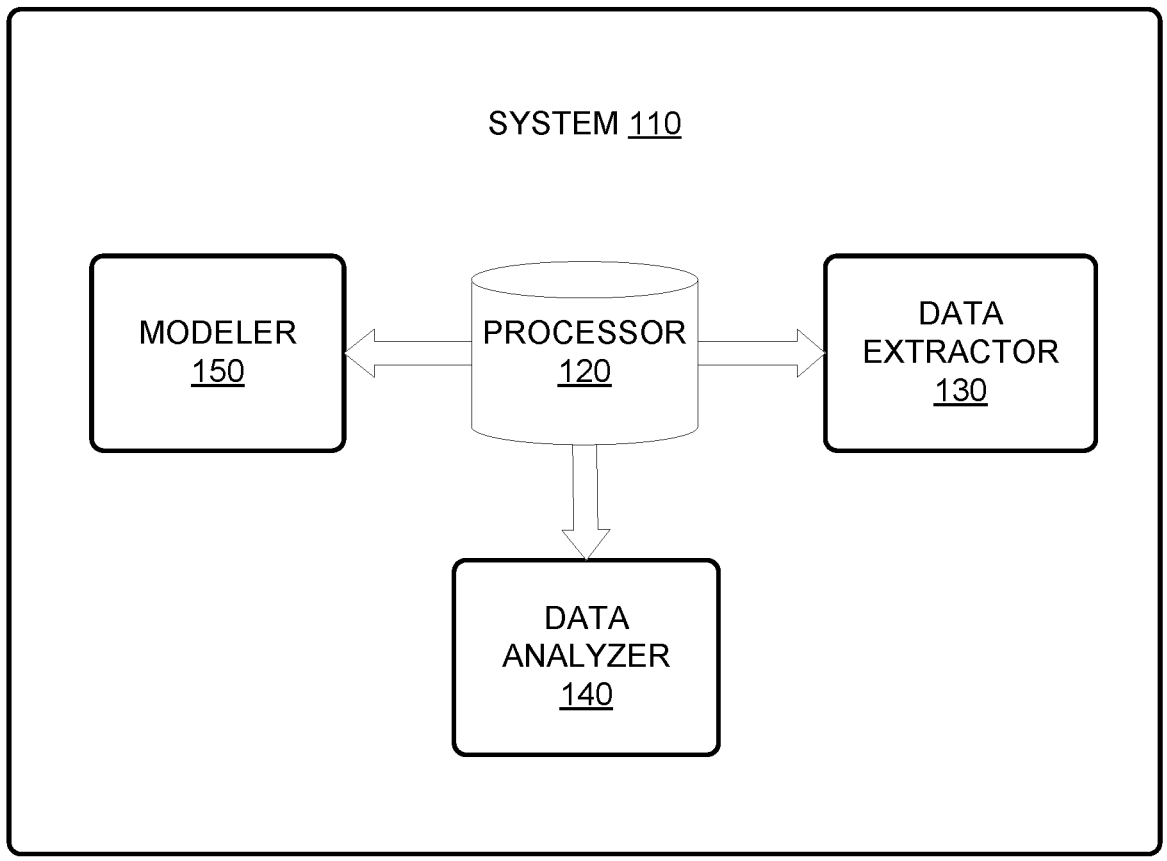
FIG. 1 illustrates a solution architecture prediction system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for predicting a solution architecture for creating and implementing a solution addressing a client's concern. A solution architecture prediction system (SAPS) hereinafter referred to as "system" may be used to provide intelligent recommendations for determining a solution architecture for holistically processing a client requirement considering various factors and market tools. The system may access market data such as tools, techniques, and technology platforms available in the market at a given time. The system may access historical data associated with the client requirement. The system may also access infrastructure data associated with supporting infrastructure present in an organization. In an example, an input obtained from skilled personnel pertaining to the determination of the solution architecture may also be processed by the system.

The system may implement various Artificial Intelligence (AI) based tools and techniques to process the market data, the historical data, the input from the skilled personnel and the infrastructure data for analysis of various factors associated with determining the solution architecture. Further, the AI-based techniques may cognitively update the market data, the historical data, and the infrastructure data. The system may identify various components such as a tool, a technique, a technology platform, and the like, required for determining the solution architecture based on the market data, the historical data, the input from the skilled personnel, and the infrastructure data. Additionally, the system may access the components for their credibility with respect to client requirements. Further, the system may cognitively learn from the inputs provided by the skilled personnel and implement the learning to identify various components and access the same for their credibility.

In an example embodiment, the system may include a processor coupled to a data extractor, a data analyzer, and a modeler. The data extractor may receive a solution prediction requirement associated with a service provided to a user. The solution prediction requirement may be related to a solution to an issue pertaining to the service. The data extractor may obtain historical data and infrastructure data pertaining to the processing of the solution prediction requirement from a data source. The historical data may include information regarding a previous solution for resolving the issue. The infrastructure data may include infrastructure information associated with processing the solution prediction requirement. The data extractor may implement an artificial intelligence component to determine a requirement fulfillment index for the previous solution associated with processing the solution prediction requirement to create a historical solution evaluation matrix.

The data analyzer may implement an artificial intelligence model to identify, from the data source, a plurality of solution components preponderant to deriving the solution associated with the issue. The data analyzer may obtain solution component data from the data source. The solution component data may include information pertaining to each of the plurality of solution components. The data analyzer may map solution component data with each of a pre-existing plurality of solution attributes to determine a performance score indicative of a performance of each of the plurality of solution components associated with each of the solution attributes.

The modeler may implement the artificial intelligence model to map the solution component data and the infrastructure data with the performance score to create a solution database comprising a potential solution for the issue. The modeler may map the potential solution with each of the plurality of concern categories associated with processing the solution prediction requirement to create a potential solution evaluation matrix. The modeler may evaluate the historical solution evaluation matrix and the potential solution evaluation matrix to determine a credibility score indicative of preponderance for each of the previous solution and the potential solution. Based on the evaluation, the modeler may generate a solution prediction data including the solution for the issue associated with the service user. The solution for the issue includes the previous solution, the potential solution, and the associated credibility score. The modeler may select a service solution from the solution prediction data to process the solution prediction requirement, the selected service solution being implemented to resolve the solution prediction requirement. In an example, the potential solution may include one or more of a hybrid AI recommendation and a market solution recommendation, based on a technical solution, such as a new tool or technique available in market or tools and techniques that have not been used previously.

Accordingly, predicting a solution architecture for creating and implementing the solution may include creating an AI aided collective knowledge base to provide optimal solution architecture for a given client requirement. The collective knowledge base may facilitate the creation and curation of the solution for catering to unique client requirements across various industrial sectors. Furthermore, the present disclosure allows for evaluation and subsequent use of new tools and techniques available in the market. Because the new tools and techniques may not have been used previously, corresponding historical information may not be available. The present disclosure provides for identification of such new tools in the market layer and the AI model may predict potential challenges, defects, and usage of the new tool in a recommended solution.

FIG. 1 illustrates a system 110 for solution architecture prediction, according to an example of the implementation of the present disclosure. In an example, the system 110 may include a processor 120. The processor 120 may be coupled to a data extractor 130, a data analyzer 140, and a modeler 150. The data extractor 130 may receive a solution prediction requirement associated with a service provided to a user. The solution prediction requirement may be related to a solution to an issue pertaining to the service. The service may refer to any operation undertaken by an organization for meeting requirements from a client. The user may be the client of an organization implementing the system 110. The issue may be associated with various aspects of the service. The solution may refer to the implementation of a technique for resolving the issue. The solution may include a tool, a technique, a technology platform, and the like that may be implemented for resolving the issue.

For example, an organization may provide information technology-enabled services to various clients. In an example, the service may include an issue such as building a chatbot for e-learning sites supporting a given number of users on various platforms such as a desktop, a mobile platform, and the like to be used as a service mode. In another example, the service may include an issue such as requirement of a Customer Relationship Management (CRM) platform for a telecom support domain supporting a given number of users on various platforms such as a desktop, a mobile platform, and the like. The solution prediction requirement may be associated with determining a solution architecture for creating and implementing the solution for resolving the aforementioned issues and providing the service to the user.

The data extractor 130 may obtain historical data and infrastructure data pertaining to the processing of the solution prediction requirement from a data source. The historical data may include information regarding a previous solution for resolving the issue. The infrastructure data may include infrastructure information associated with processing the solution prediction requirement. The data source may include various data sources such as an organization's internal databases, various external databases accessible to an organization. Further, the data source may include various websites across the Internet that may be accessible to an organization. The previous solution may be a solution that may have been implemented by the organization for a particular issue. In an exemplary embodiment, the previous solution may be an existing solution implemented by an organization for a particular issue. The previous solution may refer to multiple solutions deployed by an organization for a particular issue. The previous solution may include a tool, a technique, a technology platform, and the like implemented by an organization for a particular issue. In an example, the historical data associated with the previous solution may include information on various tools, techniques, and technology platforms deployed to create that solution. The infrastructure information may be associated with the implementation of the previous solution. In an exemplary embodiment, the infrastructure information may be associated with various technology platforms accessible to an organization for implementing the previous solution. Additionally, the infrastructure information may include information associated with various technology platforms that may be required for deploying various tools, techniques, and technology platforms for creating and implementing the solution architecture.

The data extractor 130 may implement an artificial intelligence component to determine a requirement fulfillment index for the previous solution associated with processing the solution prediction requirement to create a historical solution evaluation matrix. The requirement fulfillment index may be based on occurrences of concern categories in a previous solution. The plurality of concern categories (also referred to as concerned categories hereinafter) may include client data associated with the solution prediction requirement. The concern categories may include various measurable parameters that may have an impact on determining the credibility of the previous solution with respect to determining the solution architecture for processing the solution prediction requirement. In an exemplary embodiment, the concern categories may include parameters such as a defect, an incident, a concern, a risk, integration issues, compatibility issues, security vulnerability issues, performance issues, and the like associated with the previous solution.

The data extractor 130 may implement the artificial intelligence component to identify information associated with the concern categories such as the defect, the incident, the concern, and the risk associated with the previous solution from the historical data. In an example, the information associated with the concern categories may be identified for the tools, techniques, and technology platforms that may have been deployed to create a particular previous solution. The data extractor 130 may also determine a requirement fulfillment index associated with the previous solution, based on the occurrences of the defect, the incident, the concern, and the risk in each occurrence category. to generate the historical solution evaluation matrix as explained in detail later in the description. The historical solution evaluation matrix may include a requirement fulfillment index for each previous solution. Further, the historical solution evaluation matrix may include information on various parameters such as the defect, the incident, the risk, the integration issues, the concern, the compatibility issues, the security vulnerability issues, the performance issues and the like associated with the tools, techniques, and technology platforms that may have been deployed to create the previous solution.

In an example, the historical solution evaluation matrix may include the information on the previous solution and associated concern categories with respect to an occurrence level category such as a high occurrence, a medium occurrence, and a low occurrence for that concern category. The aforementioned analysis may facilitate in gauging the severity of the defect, the incident, the risk, the integration issues, the concern, the compatibility issues, the security vulnerability issues, and the performance issues. For example, the artificial intelligence component may identify a tool/technique deployed by a previous solution to include two (2) defects, one (1) incident, 0 risk, and 1 concern based on the historical data. For example, as stated above, the issue may be requirement of a Customer Relationship Management (CRM) platform for a telecom support domain supporting a given number of users on various platforms such as a desktop, a mobile platform, and the like. The tools/techniques that may have been deployed by an organization for the creation of solution architecture for the aforementioned issue may be, for example, HubSpot® CRM, FreshSales®, Siebel® CRM, SalesForce® Sales Cloud and the like. The artificial intelligence component may classify the tools such as HubSpot® CRM, FreshSales®, Siebel® CRM, and SalesForce® Sales Cloud into the high defect occurrence, a medium incident occurrence, a low-risk occurrence, and a medium concern occurrence (described in further detail by way of the FIGS. 7A-7C).

Thus, the requirement fulfillment index, may be determined from the historical data and the data extractor 130 may map the requirement fulfillment index for each previous solution to create the historical solution evaluation matrix. The historical solution evaluation matrix may include information on the defects, incidents, concerns, risks, integration issues, security vulnerability issues, and performance issues currently associated with the previous solution. Additionally, the historical solution evaluation matrix may include predicted information on the occurrence of the defects, incidents, concerns, and risks associated with the previous solution.

The data analyzer 140 may implement an Artificial Intelligence (AI) model to identify, from the data source, a plurality of solution components (also referred to as solution components hereinafter) preponderant to deriving the solution associated with the issue. The solution components may be the tools, techniques, and technology platforms available in the market that may be significant in creating and implementing the solution architecture for the issue. For example, as stated above, the issue may be requirement of the Customer Relationship Management (CRM) platform. The solution components identified from the data sources for this issue may include tools such as Vlocity®, SalesForce® Sales Cloud, Oracle Netsuite® CRM, and the like. The solution components identified from the data sources may be various tools, techniques, and technology platforms available in the market that may be associated with the solution prediction requirement. Such identification may aid in determining new tools, which have not been used for the solution prediction requirement previously.

The AI model may obtain solution component data from the data source. The solution component data may include information pertaining to each of the solution components. The data analyzer 140 may deploy techniques such as web crawling, Natural Language Processing (NLP), and the like to obtain solution component data from the data source. In accordance with various embodiments of the present disclosure, the solution component data may include information associated with at least one of a component defect, a component incident, a component concern, and a component risk associated with the solution components. The component defect may be a defect associated with any of the solution components. The component incident may be an incident associated with any of the solution components. The component concern may be a concern associated with any of the solution components. The component risk may be a risk associated with any of the solution components. Further, the AI model may determine the integration issues, the concern, the compatibility issues, the security vulnerability issues, and the performance issues for each of the solution components.

The data analyzer 140 may map solution component data with each of a pre-existing plurality of solution attributes (also referred to as solution attributes hereinafter) to determine a performance score indicative of a performance of each of the solution components associated with each of the solution attributes. The solution attributes may be various measurable parameters that may facilitate the AI model to decipher the performance of a solution component with respect to the solution prediction requirement.

In accordance with various embodiments of the present disclosure, the solution attributes include at least one of an infrastructure index, a user experience index, a popularity index, a scalability index, a community support index, and a requirement fulfillment index. In accordance to various embodiments of the present disclosure, the requirement fulfillment index may be determined from the values of the infrastructure index, the user experience index, the popularity index, the scalability index, and the community support index (described further by way of description for FIG. 5). The AI model may determine the performance score for each of the tools/techniques identified from the data sources with respect to each of the solution attributes. For example, the AI model may determine the performance score for each of the Vlocity®, SalesForce® Sales Cloud, and Oracle Netsuite® CRM with respect to the infrastructure index, the user experience index, the popularity index, the scalability index, the community support index, and the requirement fulfillment index. In accordance with various embodiments of the present disclosure, the AI model may determine the performance score for each of the tools, techniques, and technology platforms from the previous solution and update the same in the historical solution evaluation matrix. The historical solution evaluation matrix may include the requirement fulfillment index for the previous solution.

The modeler 150 may implement the AI model to map the solution component data and the infrastructure data with the performance score to create a solution database comprising a potential solution for the issue. The solution database facilitates a check for compatibility of the solution components with the infrastructure present in an organization. The AI model may identify any compatibility issues associated with the implementation of a solution component over a given infrastructure in an organization. The solution database may facilitate a check for the integration of the solution components within the infrastructure of an organization. The AI model may identify any integration issues associated with the implementation of a solution component with a given infrastructure in an organization. Additionally, the AI model may use the performance score value for any of the infrastructure index, the user experience index, the popularity index, the scalability index, the community support index, and the requirement fulfillment index to check for the compatibility and integration of a solution component with the infrastructure of an organization. The potential solution may include a technical solution, such as a tool, a technique, a technology platform, and the like that may be available in the market, that may be compatible with the infrastructure of an organization, and have a value of the requirement fulfillment index above a threshold value for the requirement fulfillment index. In an exemplary embodiment, the threshold value for the requirement fulfillment index may be identified by the AI model automatically based on the solution component data and the solution prediction requirement. In an example, the AI model may require input from a user of the system 110 for determining the threshold value of the requirement fulfillment index. Thus, the potential solution may include at least one of a hybrid AI recommendation and a market solution recommendation, based on available tools and techniques in the market. In an example, the potential solution may include a new technical solution available in the market, such as a technical solution that has not been used previously for processing a similar solution prediction requirement or a similar issue.

The modeler 150 may map the potential solution with each of the concern categories associated with processing the solution prediction requirement to create a potential solution evaluation matrix. In accordance with various embodiments of the present disclosure, the modeler 150 may obtain solution component data including information associated with at least one of the component defect, the component incident, the component concern, and the component risk associated with the potential solution. The modeler 150 may determine an occurrence probability for a second event associated with one of the component defect, the component incident, the component concern, and the component risk based on the implementation of the AI model on the solution component data. The second event may be an event of the occurrence of the component defect, the component incident, the component concern, and the component risk that had been identified to have occurred while implementing a particular solution component in the potential solution. The modeler 150 may map the occurrence probability for the second event with the concern categories to create the potential solution evaluation matrix. The AI model may map the information from the potential solution with the concern categories such as the defect, the incident, the concern, and the risk to a determine a predicted risk, a predicted defect, a predicted incident, a predicted concern for the potential solution based on the solution component data and the performance score.

The modeler 150 may evaluate the historical solution evaluation matrix and the potential solution evaluation matrix to determine a credibility score indicative of preponderance for each of the previous solution and the potential solution. The AI model may amalgamate the information on the tools, techniques, and technology platforms from the previous solution and the potential solution with respect to various concern categories and the solution attributes to determine the credibility score. Based on the evaluation, the modeler 150 may generate a solution prediction data including the solution for the issue associated with the service user. The solution for the issue includes the previous solution, the potential solution, and the associated credibility score. The AI model may create the solution prediction data based on a hybrid AI logic that may amalgamate various techniques from supervised and unsupervised AI models. The solution prediction data may include a hybridized tabulation of the tools, techniques, and technology platforms from the previous solution and the potential solution with respect to various concern categories, the solution attributes, and the credibility score.

The modeler 150 may map information from the historical solution evaluation matrix and the potential solution evaluation matrix with at least one of the infrastructure index, the user experience index, the popularity index, the scalability index, the community support index, and the requirement fulfillment index to create an upvote library. The AI model may determine a set of rules based on the aforementioned mapping. The rules may be related to ascertaining the priority of a tool, techniques, and technology platform in the solution prediction data. The upvote library may include a set of rules. The AI model may update the upvote library automatically based on the historical data and the solution component data. In an example, the AI model may update the upvote library based on input for a user of the system 110.

The modeler 150 may assign a solution rank to each of the previous solution and the potential solution in the solution prediction data, based on respective credibility scores. Further, the modeler 150 may compare the credibility score for each of the solutions in the solution prediction data to identify a conflicting solution rank in the solution prediction data, the conflicting solution rank indicative of a similar credibility score for the previous solution and the potential solution. The modeler 150 may elevate the solution rank for at least one solution associated with the conflicting solution rank, based on comparing the solution associated with the conflicting solution rank with the upvote library. The modeler 150 may select a service solution from the solution prediction data to process the solution prediction requirement. The selected service solution may be implemented to resolve the solution prediction requirement. In an example, the service solution may be a tool, a technique, a technology platform, and the like that may be implemented for resolving the issue.

For the sake of brevity and technical clarity, the description of the system 110 may be restricted to a few exemplary embodiments; however, to a person skilled in the art, it should be clear that the system 110 may be used for the fulfillment of various solution architecture predictions other than those mentioned hereinafter.

Figure 2:
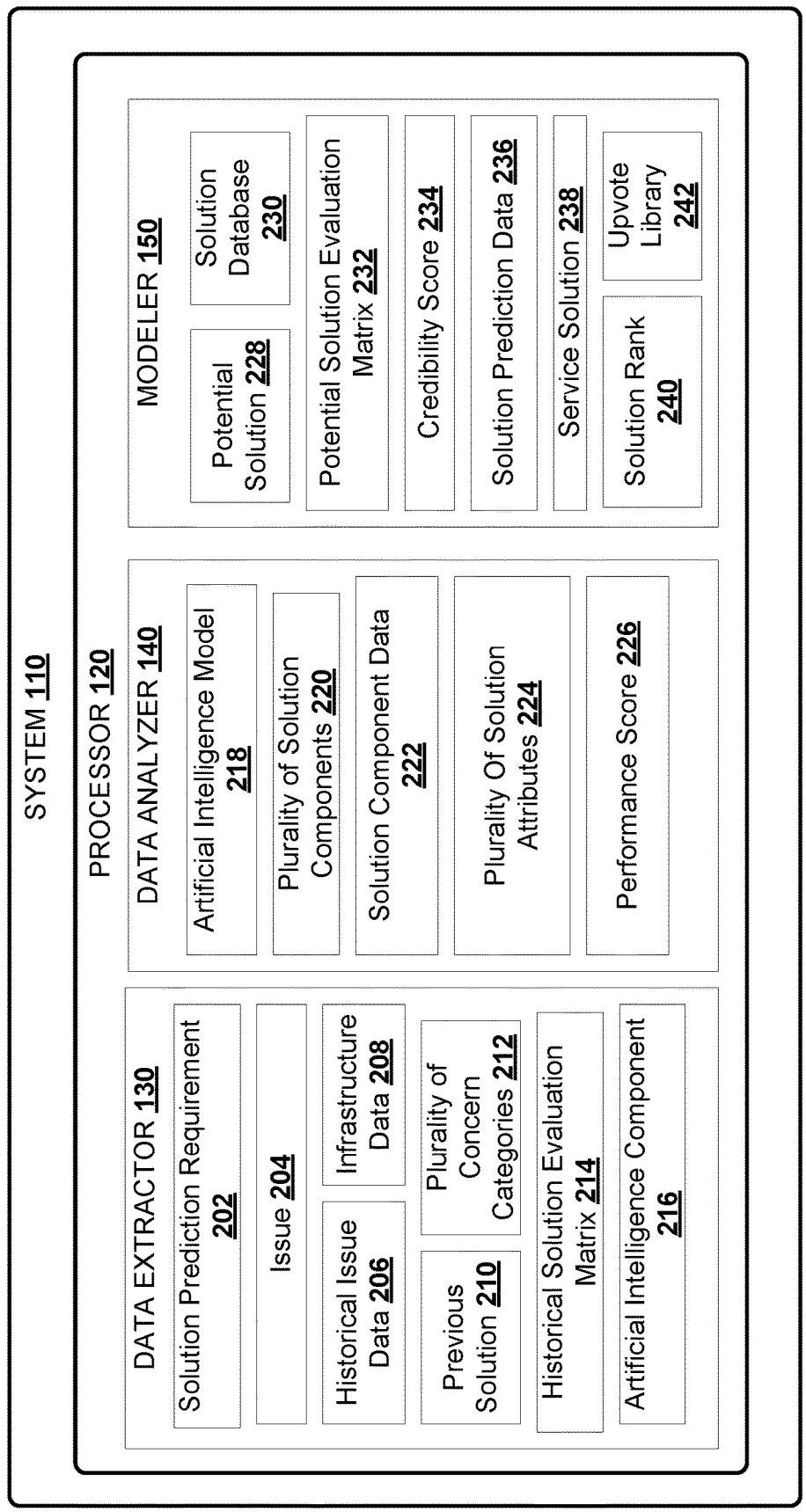
FIG. 2 illustrates various components of the solution architecture prediction system, according to an example embodiment of the present disclosure.

FIG. 2 illustrates various components of a solution prediction system 200, according to an example embodiment of the present disclosure. The system 200 may be an exemplary embodiment of the system 110 described with respect to the description for FIG. 1. Any of the components of the system 110 may be deployed by the system 200 and may be referred to for describing the system 200. In an example embodiment, the system 200 may include the processor 120. The processor 120 may be coupled to the data extractor 130, the data analyzer 140, and the modeler 150.

The data extractor 130 may receive a solution prediction requirement 202 associated with a service provided to a user. The solution prediction requirement may be related to a solution to an issue 204 pertaining to the service. The solution may include a tool, a technique, a technology platform, and the like that may be implemented for resolving the issue 204. The data extractor 130 may obtain historical data 206 and infrastructure data 208 pertaining to the processing of the solution prediction requirement from a data source. The historical data 206 may include information regarding a previous solution 210 such as various tools, techniques, and technology platforms that may have been implemented by an organization for resolving the issue 204. The infrastructure data 208 may include infrastructure information such as platforms for implementing various tools, techniques, and technology platforms associated with processing the solution prediction requirement 202. The data extractor 130 may implement an artificial intelligence component 216 (referred to as AI component 216 hereinafter) to determine for each of the previous solution 210 a number of occurrences of a plurality of concern categories 212 (referred to as concerned categories 212 hereinafter) for each occurrence level category. The AI component 216 may create a historical solution evaluation matrix 214 based on the aforementioned determination. The AI component 216 may use various techniques such as NLP, Text Mining (TM), and the like to map each of the previous solution 210 with the concern categories 212 for creating the historical solution evaluation matrix 214. The AI component 216 may use various other supervised learning models to map each of the previous solution 210 with the concern categories 212 for creating the historical solution evaluation matrix 214.

The AI component 216 may identify from historical data 206 information on the previous solution 210 such as various tools, techniques, and technology platforms associated with the concern categories 212 such as a defect, an incident, a concern, a risk, integration issues, compatibility issues, security vulnerability issues, performance issues and the like. The AI component 216 may use various techniques such as NLP, Text Mining (TM), and the like to identify the aforementioned information.

The data analyzer 140 may implement an Artificial Intelligence (AI) model 218 to identify a plurality of solution components 220 (referred to as solution components 220 hereinafter) preponderant to deriving the solution associated with the issue. The solution components 220 may be the tools, techniques, and technology platforms available in the market that may be significant to creating and implementing the solution architecture for the issue 204. In an exemplary embodiment, the solution components 220 be different from the tools, techniques, and technology platforms identified from the historical data 206. Alternatively, the solution components 220 may include an update in the tools, techniques, and technology platforms identified from the historical data 206. In an example, the solution components 220 may include the same tools, techniques, and technology platforms identified from the historical data 206. The AI model 218 may deploy techniques such as web crawling, Natural Language Processing (NLP), and the like to obtain solution component data 222 from the data source. The solution component data 222 may include information pertaining to each of the solution components 220. Further, the solution component data 222 may include information associated with at least one of a component defect, a component incident, a component concern, and a component risk associated with the solution components.

The AI model 218 may map the solution component data 222 with each of a pre-existing plurality of solution attributes 224 (referred to as solution attributes 224 hereinafter) to determine a performance score 226. The solution attributes 224 may be measurable factors that may be used to gauge the solution components 220 for their aptness for resolving the issue 204. The solution attributes 224 may include an infrastructure index, a user experience index, a popularity index, a scalability index, a community support index, and a requirement fulfillment index. In accordance with various embodiments of the present disclosure, the requirement fulfillment index may be determined from the values of the infrastructure index, the user experience index, the popularity index, the scalability index, and the community support index. The performance score 226 may be indicative of the aptness of each of the solution components 220 (described further by way of FIGS. 5-6). The AI model 218 may implement techniques such as Named-entity recognition (NER), Web scraping, data parsing, Part of Speech tagging (POS tagging), and the like to determine the performance score 226 associated with each of the solution attributes 224 for each of the solution components 220.

The AI model 218 may map the solution component data 222 and the infrastructure data 208 with the performance score 226 to create a solution database 230 comprising a potential solution 228 for the issue 204. The potential solution may include a tool, a technique, a technology platform, and the like that may be available in the market, that may be compatible with the infrastructure of an organization, and have the performance score 226 for each of the solution attributes 224 above a threshold value. In an exemplary embodiment, the threshold value for each of the solution attributes 224 may be identified by the AI model 218 automatically based on the solution component data 222 and the solution prediction requirement 202. In an example, the AI model 218 may require input from a user of the system 110 for determining the threshold value for each of the solution attributes 224. The AI model 218 may map the potential solution 228 with each of the concern categories 212 create a potential solution evaluation matrix 232. The AI model 218 may identify the component defect, the component incident, the component concern, and the component risk associated with the potential solution from the solution component data 222. The AI model 218 may determine an occurrence probability of the component defect, the component incident, the component concern, and the component risk to further occur in future should the potential solution 228 be implemented to resolve the issue 204. The occurrence probability of the component defect may be termed as a predicted historic defect for a solution component. The occurrence probability of the component incident may be termed as a predicted historic incident for a solution component. The occurrence probability of the component issue may be termed as a predicted historic issue for a solution component. The occurrence probability of the component risk may be termed as a predicted historic risk for a solution component. The AI model 218 may create the potential solution evaluation matrix 232 to include the predicted historic defect, the predicted historic incident, the predicted historic issue, and the predicted historic risk for a solution component. Further, the potential solution evaluation matrix 232 may include the performance score 226 associated with each of the solution components 220.

The AI model 218 may evaluate the historical solution evaluation matrix 214 and the potential solution evaluation matrix 232 to determine a credibility score 234 indicative of preponderance for each of the previous solutions 210 and the potential solution 228. The determination of the credibility score 234 may include computing a penalization factor to accommodate at least one of the defect, the incident, the concern, the risk, the integration issues, the security vulnerability issues, and the performance issues associated with the previous solution 210 and the potential solution 228. As mentioned above, the AI component 216 and the AI model 218 may determine the defect, the incident, the concern, the risk, the integration issues, the security vulnerability issues, and the performance issues associated with each of the potential solution 228 and the previous solution 210 (described further by way of FIGS. 7A-7C). Further, the credibility score 234 may include accommodating the compatibility issues for each of the potential solution 228 and the previous solution 210 with existing infrastructure in an organization.

The penalization factor for each previous solution 210 may be determined by the following equation:

$$\text{Penalization factor for the previous solution} = \text{Average}(\text{Potential integration issues}) * \text{Average}(\text{Potential performance issues}) * \text{Average}(\text{Potential security vulnerability issues}) \quad \text{Equation 1}$$

As mentioned above, the AI component 216 may include the occurrence probability for each of the factors mentioned by Equation 1 in the historical solution evaluation matrix 214. The credibility score 234 for each potential solution 228 may be determined by the following equation:

$$\text{Penalization factor for the potential solution} = \text{Average}(\text{predicted historic defects}) * \text{Average}(\text{predicted historic incidents}) * \text{Average}(\text{predicted historic concerns}) * \text{Average}(\text{predicted historic risks}) * \text{Average}(\text{potential integration issues}) * \text{Average}(\text{potential performance issues}) * \text{Average}(\text{potential security vulnerability issues}) \quad \text{Equation 2}$$

In an example, if any other factors mentioned in Equation 1 and Equation 2 may be determined as having a value zero (0), the AI model 218 may remove them from Equation 1 and Equation 2. The credibility score 234 for the previous solution 210 may be determined by the following Equation:

$$\text{Credibility Score for the previous solution} = \text{requirement fulfillment index} * (1 - \text{penalization factor}) * \text{compatibility issues} \quad \text{Equation 3}$$

where, the requirement fulfillment index may be determined by way of Equation 6 and Equation 7 present below in the document.

The credibility score 234 for the potential solution 228 may be determined by the following Equation:

$$\text{Credibility Score for the potential solution} = \text{requirement fulfillment index} * (1 - \text{penalization factor}) * \text{compatibility issues} \quad \text{Equation 4}$$

where, the requirement fulfillment index mentioned in Equation 4 may be determined based on the following Equation:

$$\text{requirement fulfillment index} = (\text{infrastructure index} + \text{user experience index} + \text{popularity index} + \text{scalability index} + \text{community support index})/4 \quad \text{Equation 5}$$

Based on the credibility score 234 for each of the potential solution 228 and the previous solution 210, the AI model 218 may create a solution prediction data 236. The solution prediction data 236 may include each of the potential solution 228 and the previous solution 210 arranged according to a value of the credibility score 234. For example, each of the potential solution 228 and the previous solution 210 may be arranged in ascending order according to the value of the credibility score 234. The AI model 218 may assign a solution rank 240 to each of the previous solution 210 and the potential solution 228 in the solution prediction data 236, based on respective credibility scores 234. For example, a solution with the highest credibility score 234 from the solution prediction data 236 may be assigned the solution rank 240 as one (1), a solution a second highest credibility score 234 may be assigned the solution rank 240 as two (2), and the like. The solution rank 240 may indicate aptness of the corresponding solution towards resolving the issue 204 associated with the solution prediction requirement 202.

In an example, the AI model 218 may map information from the historical solution evaluation matrix 214 and the potential solution evaluation matrix 232 with at least one of the infrastructure index, the user experience index, the popularity index, the scalability index, the community support index, and the requirement fulfillment index to create an upvote library 242. The upvote library 242 may include a set of rules for determining the priority of a solution over others in case the credibility score 234 may be the same for more than one solution. The AI model 218 may elevate the solution rank 240 based on the set of rules from the upvote library 242. The set of rules may include pre-defined criteria for elevating the solution rank 240 for a solution. For example, in case, the credibility score 234 for one of the previous solution 210 and one of the potential solution 228 may overlap, then the previous solution 210 may be elevated to a higher solution rank 240, based on criteria that the previous solution 210 may be "already implemented with a high user base". The AI model 218 may determine a unique upvote library for each of the solution prediction data 236. The AI model 218 may map information for each solution in the solution prediction data 236 from the historical solution evaluation matrix 214 and the potential solution evaluation matrix 232 with at least one of the infrastructure index, the user experience index, the popularity index, the scalability index, the community support index, and the requirement fulfillment index to create the upvote library 242.

The AI model may present the solution prediction data 236 to a user of the system 110. In an example, the AI model 218 may select a service solution 238 from the solution prediction data 236 to process the solution prediction requirement 202. The selected service solution 238 may be implemented to resolve the solution prediction requirement 202. In accordance with various embodiments of the present disclosure, the system 110 may be configurable to automatically select the service solution 238 and/or require input from the user of the system 110 for selecting the service solution 238.

Accordingly, the solution architecture prediction may create a collective knowledge base to provide an optimal architectural solution since it is an amalgamation of a human expert and AI-based techniques. The system 110 may reduce efforts and computational resources deployed by a team of skilled experts by leveraging AI-based techniques for speeding up the process of determination of a solution architecture. The system 110 may be scalable and may be implemented across various industrial sectors such as banking, telecommunication, and the like. It must be appreciated by a person skilled in the art that the system 110 may be implemented for predicting a solution architecture across various other industrial sectors not mentioned herein without diverting from the scope of the disclosure. The system 110 may build a virtual AI platform that may generate a solution architecture recommendation based on a holistic view considering various factors and market tools. Further, the AI platform may self-learn based on AI recommended architecture and a final Architecture such as the service solution 238 may be chosen by a human expert using techniques such as reinforcement & semi-supervised learning. Additionally, the system 110 may identify an optimal solution architecture even with partially filled data, rather than completely depending on historical data. Further, the system 110 may determine optimal solution architecture consider novel tools, techniques, and technology platforms available in the market.

Figure 3:
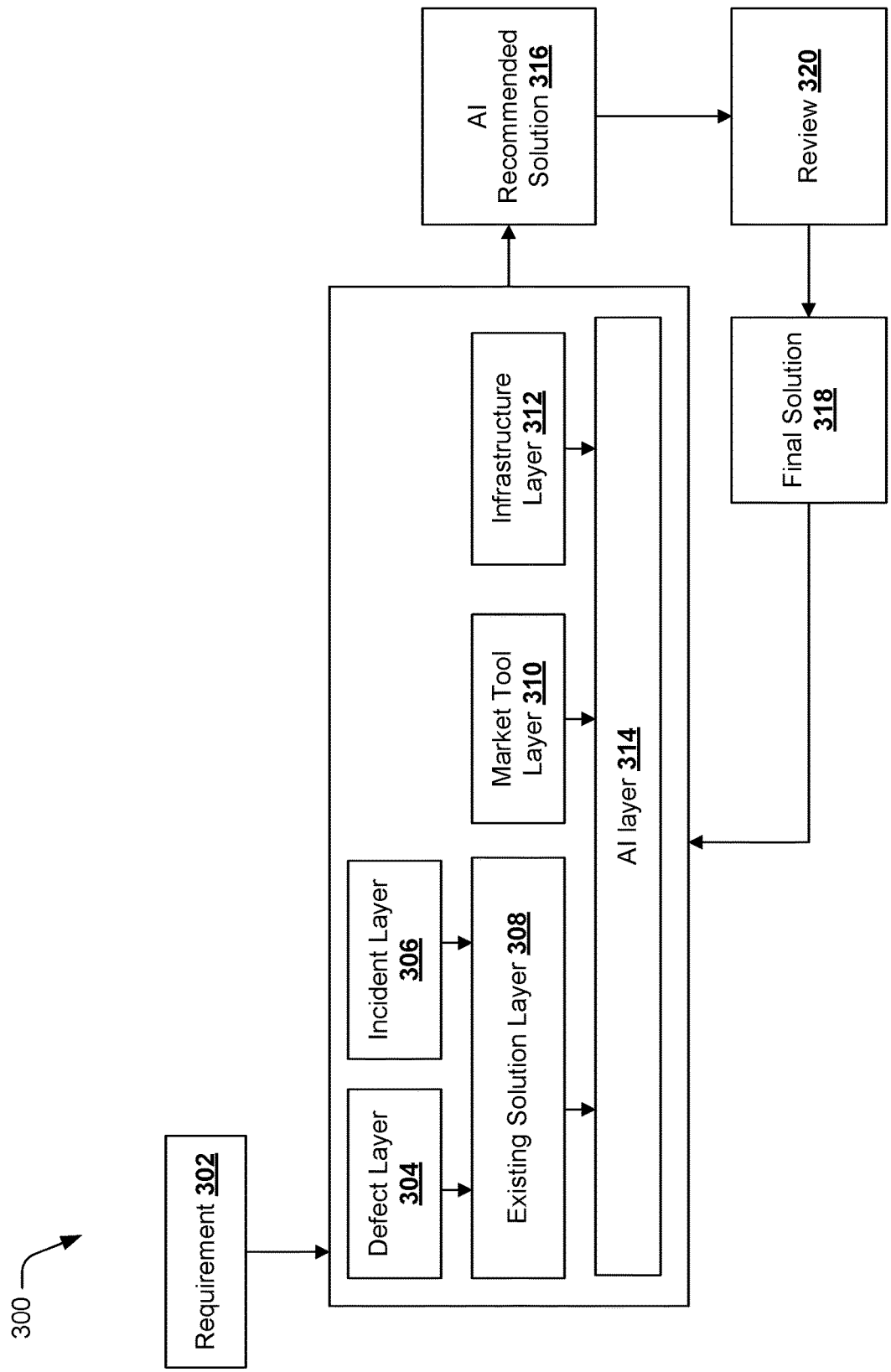
FIG. 3 illustrates an architectural diagram of the solution architecture prediction system, according to an example embodiment of the present disclosure.

FIG. 3 illustrates an architectural diagram 300 of the solution architecture prediction system 110, according to an example embodiment of the present disclosure. Any of the components of the system 110 may be referred to for describing the architectural diagram 300. As illustrated by the architectural diagram 300, the system 110 may obtain a requirement 302. The requirement 302 may be the solution prediction requirement 202. The system 110 may include an AI layer 314. The AI layer 314 may implement the AI component 216 and the AI model 218. The AI layer 314 may be based on a hybrid AI logic that may amalgamate techniques from supervised, semi-supervised, and unsupervised machine learning. The system 110 may include a defect layer 304, an incident layer 306, an existing solution layer 308, a market tool layer 310, and an infrastructure layer 312. The defect layer 304 may compile the defects, the risks, and the issues from the historical data 206. The incident layer 306 may compile various incidents into various problem categories based on the historical data 206. The existing solution layer 308 may include the client requirement data and each of the previous solution 210 associated with the client requirement. The existing solution layer 308 may obtain input from the defect layer 304 and the incident layer 306. The existing solution layer 308 may obtain the issue 204 from the requirement 302. The market tool layer 310 may identify various tools, techniques, and technology platforms available in the market for resolving the issue 204. The infrastructure layer 312 may obtain the infrastructure data 208 from the data source. The market tool layer 310, the existing solution layer 308, and the infrastructure layer 312 may provide input to the AI layer 314.

The AI layer 314, the defect layer 304, the incident layer 306, the existing solution layer 308, the market tool layer 310, and the infrastructure layer 312 may collectively implement various AI-based tools and techniques to generate an AI recommendation solution 316. The AI recommendation solution 316 may be the solution prediction data 236. The AI recommendation solution 316 may be presented for a review 320 to a skilled personnel. The skilled personnel may identify a final solution 318 from the AI recommendation solution 316. The final solution 318 may be the service solution 238.

Figure 4:
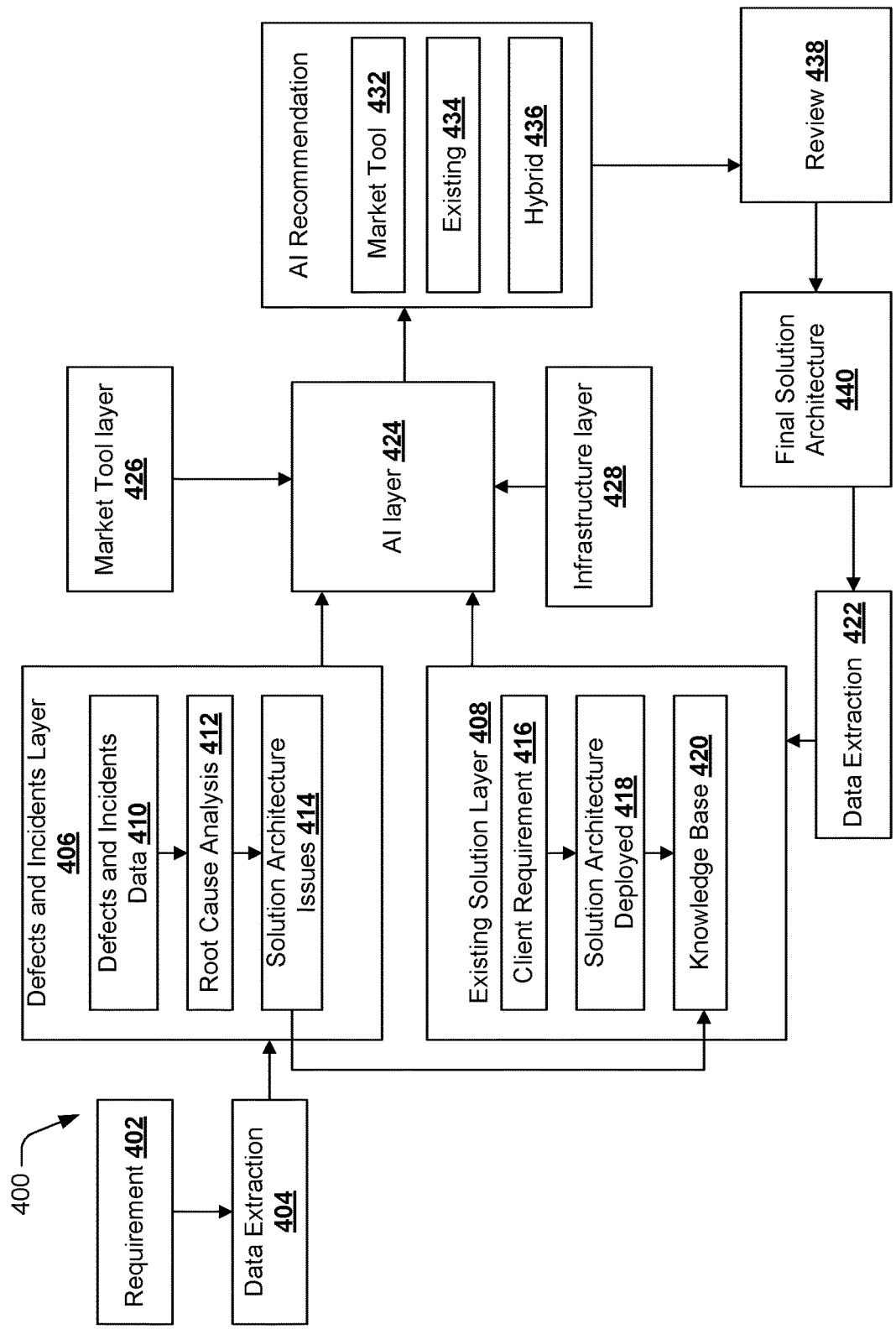
FIG. 4 illustrates a functional flow diagram of the solution architecture prediction system for predicting a solution architecture for an issue, according to an example embodiment of the present disclosure.

FIG. 4 illustrates a functional flow diagram 400 of the solution architecture prediction system 110 for predicting a solution architecture for the issue 204, according to an example embodiment of the present disclosure. Any of the components of the system 110 may be referred to for describing the functional flow diagram 400. As illustrated in the functional flow diagram 400 the system 110 may obtain a requirement 402 from a user of the system 110. The requirement 402 may be the solution prediction requirement 202. The data extractor 130 may implement a data extraction 404 based on the requirement 402. For example, the requirement 402 may be "Need a Cloud-based CRM System for a telecommunication system, supporting one thousand (1000) users". The data extraction 404 may include obtaining the historical data 206 and the infrastructure data 208 from the data source. Further, the system 110 may include a defects and incidents layer 406. The defects and incidents layer 406 may identify a defects and incidents dataset 410. The defects and incidents dataset 410 may be identified based on implementing various NLP techniques on the historical data 206. The system 110 may perform a root cause analysis 412 on the defects and incidents dataset 410. The root cause analysis 412 may facilitate the identification of a solution architecture issues set 414. The system 110 may implement techniques such as NLP based categorization of the defects and incidents dataset 410 for the root cause analysis 412.

Further, the system 110 may include an existing solution layer 408. The existing solution layer 408 may include a client requirement 416, a deployed solution architecture 418, and a knowledge base 420. The client requirement 416 may include various features preferred by a client associated with the requirement 402. For example, the client requirement 416 may include features such as call center management, billing & invoicing, call list management, third party integration, event-based notifications, field sales management, and the like associated by the requirement 402 mentioned above. The deployed solution architecture 418 may include an existing solution within an organization for processing the requirement 402. The knowledge base 420 may include each of the previous solution 210 implemented by an organization associated with the requirement 402.

The system 110 may include an infrastructure layer 428. The infrastructure layer 428 may obtain the infrastructure data 208 from the data source. The system 110 may include a market tool layer 426. The market tool layer 426 may implement such as Web scraping, Web crawling, and NLP to determine various tools, techniques, and technology platforms available in the market associated with processing the requirement 402.

The system 110 may further include an AI layer 424. The AI layer 424 may implement the AI component 216 and the AI model 218 on the defects and incidents layer 406, the existing solution layer 408, market tool layer 426, and the infrastructure layer 428. The AI layer 424 may obtain data from the defects and incidents layer 406, the existing solution layer 408, market tool layer 426, and the infrastructure layer 428 for implementing the AI component 216 and the AI model 218. The AI component 216 may include the implementation of techniques such as NLP. The AI component 216 may identify various defects such as critical defects, minor defects, and the like. Further, the AI component 216 may identify the incidents with respect to integration and performance from the defects and incidents layer 406. The AI component 216 may use an NLP library such as spaCy® to identify the incidents and defects.

The AI layer 424 may be embedded with hybrid AI logic that includes various semi-supervised, supervised/unsupervised machine learning techniques, which may be collectively referred to as the AI model 218. The AI Layer 424 may contain tools/techniques that leverage and consume data from other layers such as the defects and incidents layer 406, the existing solution layer 408, market tool layer 426, and the infrastructure layer 428 to provide solution architecture recommendations. The semi-supervised machine learning techniques may be implemented on the historical data 206 that may be partially filled. For example, if there may be few labeled data such as two hundred (200) requirements in the historical data 206, the semi-supervised machine learning techniques may label other requirements similarly. This may help in doing a pseudo labeling thereby reducing manual labeling effort and inducing self-learning. The semi-supervised machine learning techniques may then predict the optimal previous solution 210 for the requirement 402. The supervised machine learning techniques may be implemented on the historical data 206 that may be completely labeled and filled. The tool/technique may facilitate the prediction of a probable solution from the previous solution for a new requirement considering the historic data 206.

The AI layer 424 may leverage data from various layers to provide a historical data based AI recommendation 434 for processing the requirement 402. The historical data based AI recommendation 434 may be the optimal solution for processing the requirement 402 determined from the previous solution 210. In an example, data from the following layers may be used for generating the historical data based AI recommendation 434. The requirements such as from the client requirement 416 may be extracted by various requirement management tools such as JIRA®. The existing solution layer 408 may have information about a list of solutions and requirements delivered. The defects data may be extracted using defect management tools such as HP Quality Center®. The defects may be stored in the defects and incidents layer 406. The incidents data may be extracted by various incident management tools such as ServiceNow® and may be stored in defects and incidents layer 406. The infrastructure data 208 of the projects/components/versions may be residing in infrastructure layer 428.

The market tool layer 426 may leverage the AI layer 424 to extract market tools data to provide a market data based AI recommendation 432 for processing the issue 204. The market tool layer 426 may create the potential solution evaluation matrix_232 to provide a market data based AI recommendation 434. Further, the AI layer 424 may amalgamate the market data based AI recommendation 432 and the historical data based AI recommendation 434 to generate a hybrid AI recommendation 436 as also mentioned above by way of the description for FIGS. 1 and 2. The hybrid AI recommendation 436 may be the solution prediction data 236 mentioned above. The AI layer 424 may amalgamate the market data based AI recommendation 432 and the historical data based AI recommendation 434 based on the determination of the credibility score 234, the solution rank 240, and the upvote library 242. Further, the hybrid AI recommendation 436, the market data based AI recommendation 432, and the historical data based AI recommendation 434 may be presented to the user of the system 110 for a review 438. The review 438 may lead to the determination of a final solution architecture 440. The final solution architecture 440 may include the service solution 238. The AI layer 424 may implement a data extraction 422 on the final solution architecture 440. The data extraction 422 may include extracting various components of the final solution architecture 440 for updating the existing solution layer 408.

Figure 5:
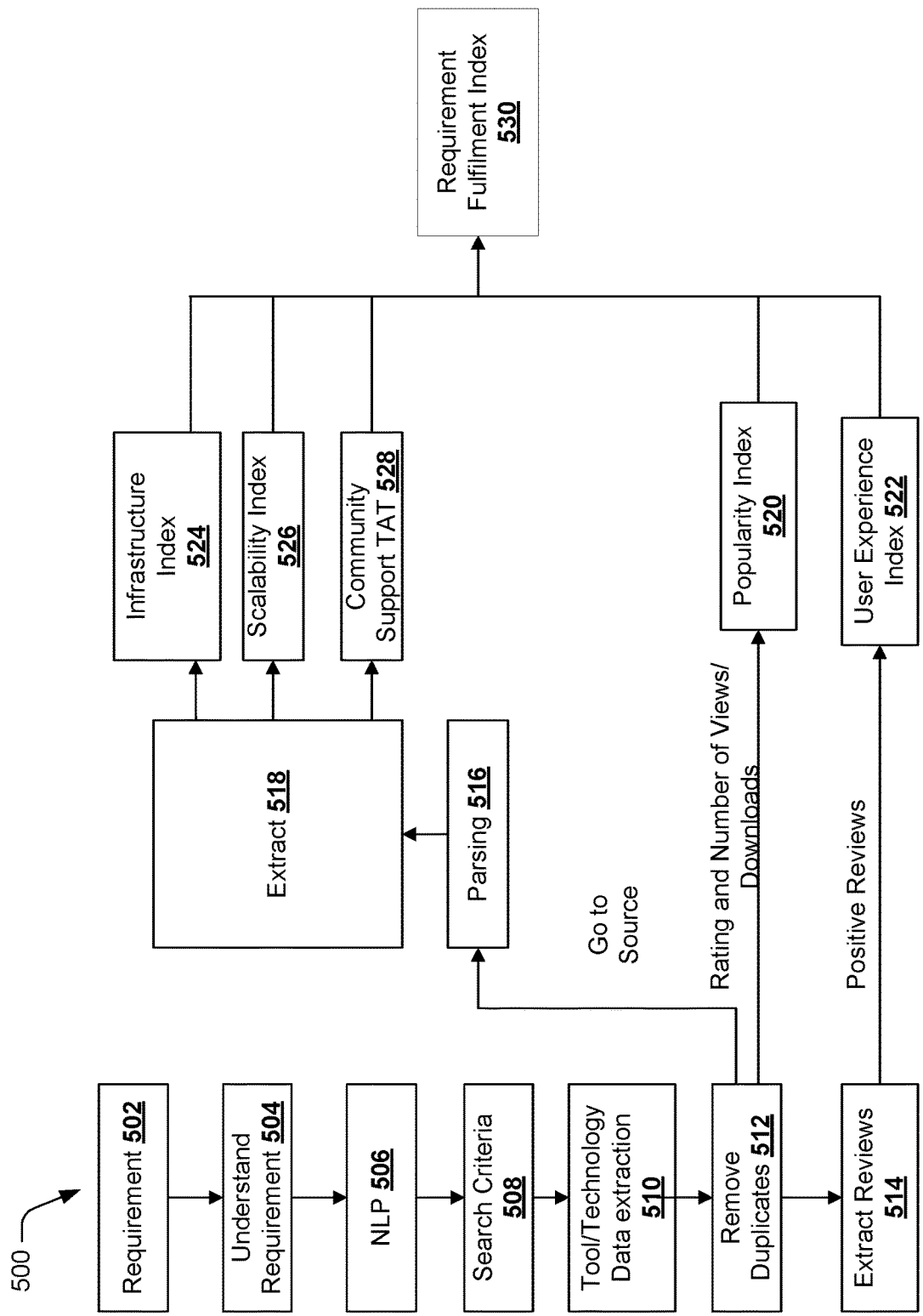
FIG. 5 illustrates an architectural diagram of a market tool layer of the solution architecture prediction system, according to an example embodiment of the present disclosure.

FIG. 5 illustrates an architectural diagram 500 of the market tool layer 426 of the solution architecture prediction system 110, according to an example embodiment of the present disclosure. Any of the components of the system 110 may be referred to for describing the architectural diagram 500. The market tool layer 426 may identify various tools, techniques technology platforms, and infrastructure prevailing in the market. The market tool layer 426 may receive a requirement 502. The requirement 502 may be the solution prediction requirement 202. The market tool layer 426 may extract this information via Web Scraping, NLP (spaCy®) & Web crawling techniques for effectively leveraging various tools, techniques technology platforms, and infrastructure available in the market for processing the requirement 502. The market tool layer 426 may implement an understanding 504 for understanding the requirement. Thereafter, the market tool layer 426 may implement an NLP component 506 for identifying a search criteria set 508. The search criteria set 508 may include various criteria that may be used by the market tool layer 426 for identifying various tools, techniques technology platforms, and infrastructure prevailing in the market that may be associated with the requirement. The NLP component 506 may include the implementation of techniques such as NER, Part of Speech tagging (POS tagging). The NLP component 506 may use an NLP library such as spaCy® for processing the requirement 502 and determining the search criteria set 508.

Further, the market tool layer 426 may implement an extraction 510. The extraction 510 may include extracting relevant tools/technology for each of the search criteria from the search criteria set 508. The extraction 510 may be implemented using techniques such as Web Scraping. For example, the extraction 510 may include identifying credible data sources such as technical forums for extracting relevant tools/technology for each of the search criteria. The extraction 510 may include compiling scraped information on relevant tools/technology for each of the search criteria. The market tool layer 426 may further implement a process 512 for removing duplicates. The process 512 may implement tools such as Requests® for removing duplicates. The market tool layer 426 may analyze factors such as a count of views, a count of downloads for each tool/technology from the data source. The market tool layer 426 may determine a popularity index 512 from the aforementioned analysis.

The market tool layer 426 may further implement a parsing technique 516 after the process 512. The market tool layer 426 may access a website associated with a tool/technology present in a dataset created after the process 512. The market tool layer 426 may implement the parsing technique 516 on the website associated with a tool/technology present in a dataset created after the process 512. The parsing technique 516 may include the implementation of NLP techniques such as NER, POS tagging, and the like. The market tool layer 426 may implement an extraction 518 after the parsing technique 516. The parsing technique 516 and the extraction 518 may extract infrastructure information from the website to create an infrastructure index 524. The infrastructure information may include infrastructure supported by the tool/technology and infrastructure required by the tool/technology. The parsing technique 516 and the extraction 518 may extract scalability information from the website to create a scalability index 526. The scalability information may include analyzing factors such as a count of users supported by a tool/technology, a total count of users specified in the requirement 502.

The parsing technique 516 and the extraction 518 may extract information on various technical queries posted on the website associated with the tool/technology. The market tool layer 426 may determine an average Turn Around Time (TAT) for each of the tools/technology to create community support index 528. Further, the market tool layer 426 may implement an extraction 514 after the process. The extraction 514 may include extraction of review comments for each tool/technique identified from the process 512 after removing duplicates in the dataset created by the extraction 510. The extraction 514 may include performing a sentiment analysis to identify positive reviews for the tool/technology. The sentiment analysis may be done using tools and libraries such as GitHUB®, Beautifulsoup® library, and the like. The market tool layer 426 may create a user experience index 522 based on the analyzed positive reviews. The popularity index 512, the infrastructure index 524, the scalability index 526, the community support index 528, and the user experience index 522 may be processed as mentioned by way of Equation 5 to determine a requirement fulfillment index 530. The requirement fulfillment index 530 may indicate a tool/technology, which may be appropriate for processing the requirement. In an example embodiment, the requirement fulfillment index 530 may be determined for a tool/technology present in the historical data 206 and for the tool/technique identified from the process 512. The historical solution evaluation matrix 214 may include the requirement fulfillment index 530 for each previous solution 210 present therein (explained in detail by way of the description for FIGS. 7A-7C). The potential solution evaluation matrix 232 may include the requirement fulfillment index 530 for each potential solution 228 present therein. In an example, the requirement fulfillment index 530 for the potential solution 228 may be determined as described by equation 5.

Figure 6:
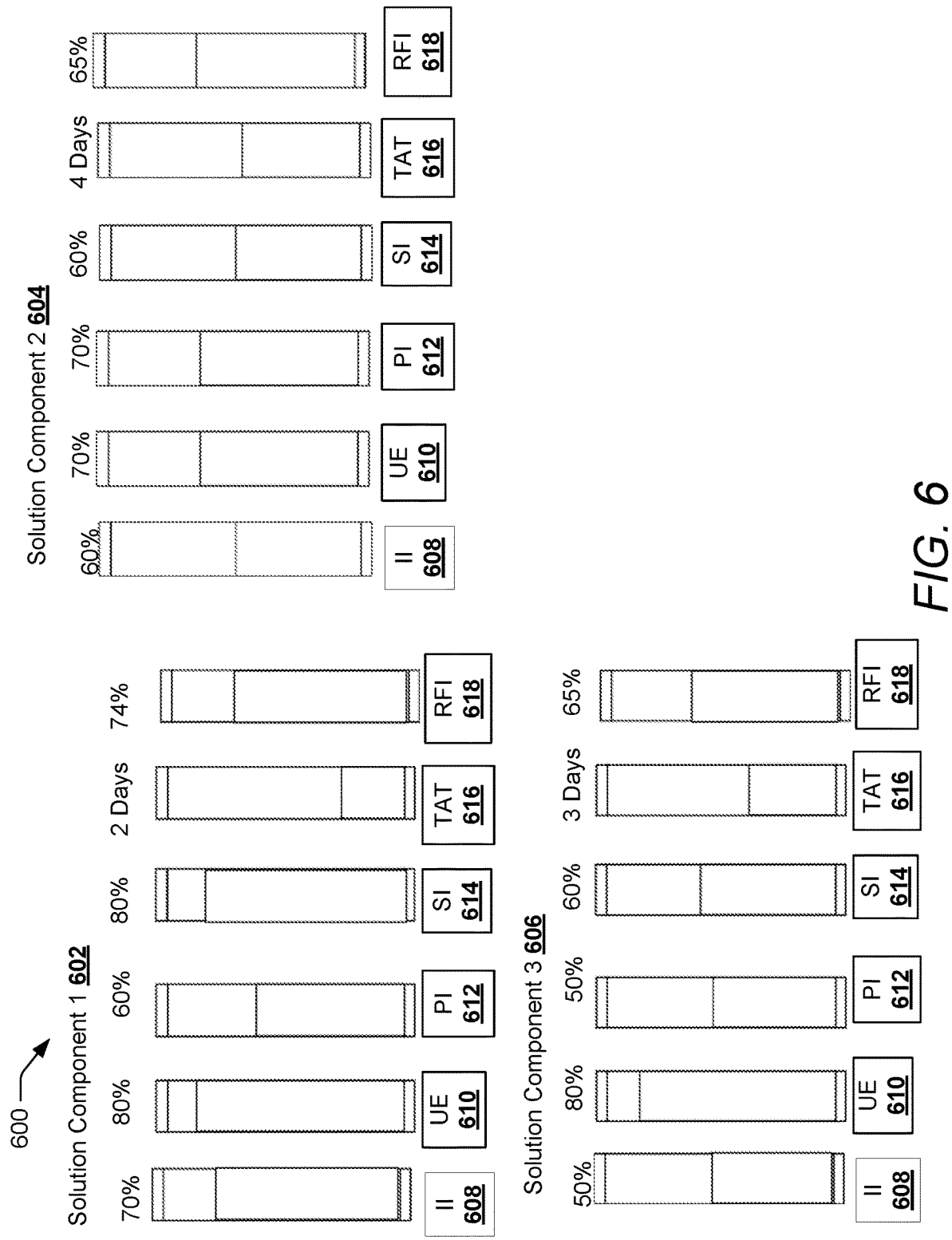
FIG. 6 illustrates a comparative representation of a solution component identified by the solution architecture prediction system, mapped with a plurality of solution attributes, according to an example embodiment of the present disclosure.

FIG. 6 illustrates a comparative representation 600 of the solution components 220 identified by the solution architecture prediction system 110, mapped with the solution attributes 226, according to an example embodiment of the present disclosure. Any of the components of the system 110 may be referred to for describing the comparative representation 600. The tools/technology identified by the architectural diagram 500 may be the solution components 220. The popularity index 512, the infrastructure index 524, the scalability index 526, the community support index 528, the user experience index 522, and the requirement fulfillment index 530 may be the solution attributes 224. The comparative representation 600 presents a comparative analysis of a three (3) solution components 220 namely, a solution component 1-602, a solution component 2-604, and a solution component 3-606. Each of the solution components, the solution component 1-602, the solution component 2-604, and the solution component 3-606 may include an II-608, a UE-610, a PI-612, an SI-614, a TAT-616, and an RFI-618. The II-608 may be the infrastructure index 524, the UE-610 may be the user experience index 522, the PI-612 may be the popularity index 512, the SI-614 may be scalability index 526, the TAT-616 may be the community support index 528, and the RFI-618 may be the requirement fulfillment index 530. As illustrated by FIG. 6 each of the solution components has a different value for the II-608, the UE-610, the PI-612, the SI-614, the TAT-616, and the RFI-618.

Figure 7A:
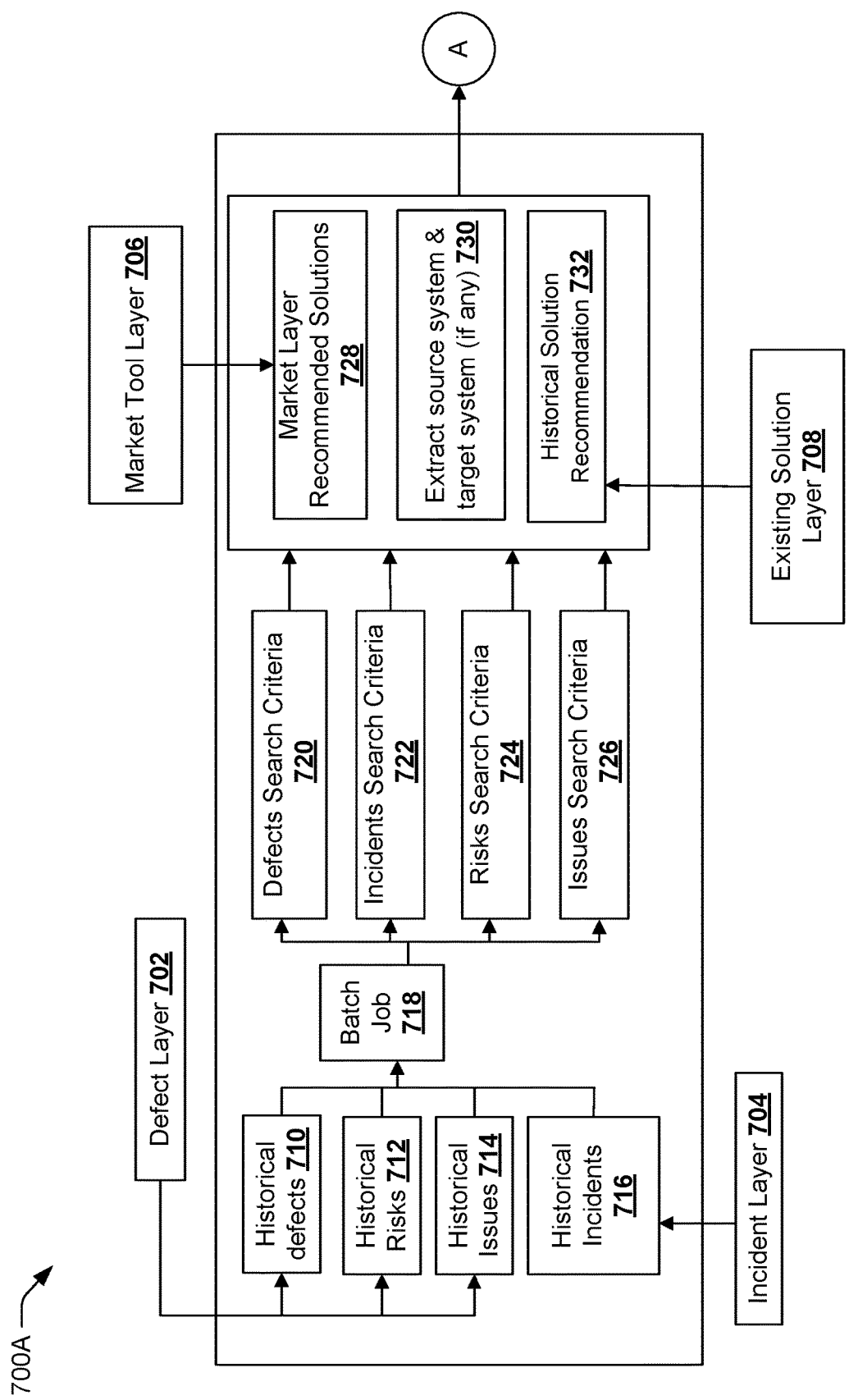
FIGS. 7A-7C illustrate a flow diagram for an artificial intelligence model deployed by the solution architecture prediction system, according to an example embodiment of the present disclosure.
Figure 7B:
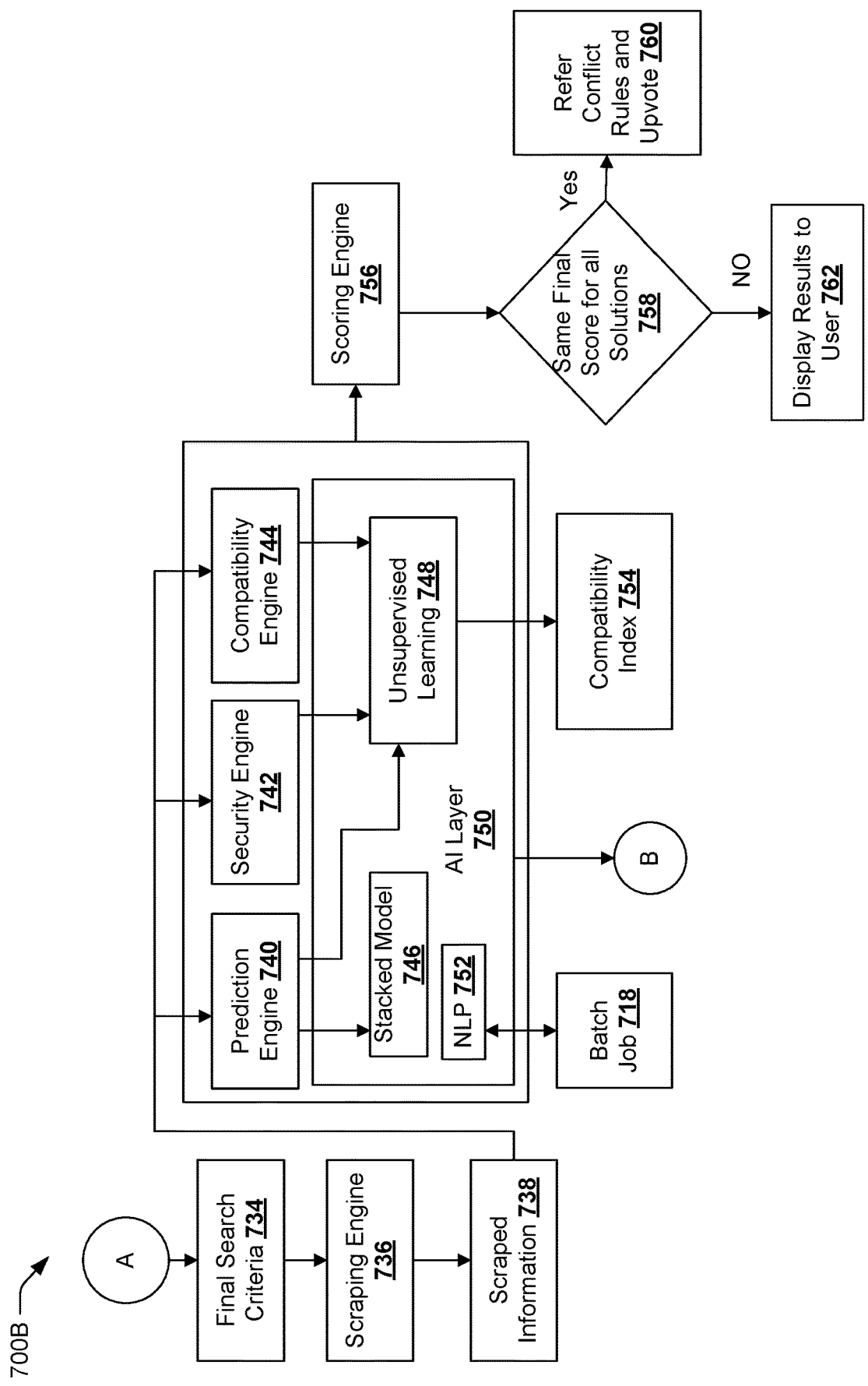
Figure 7C:
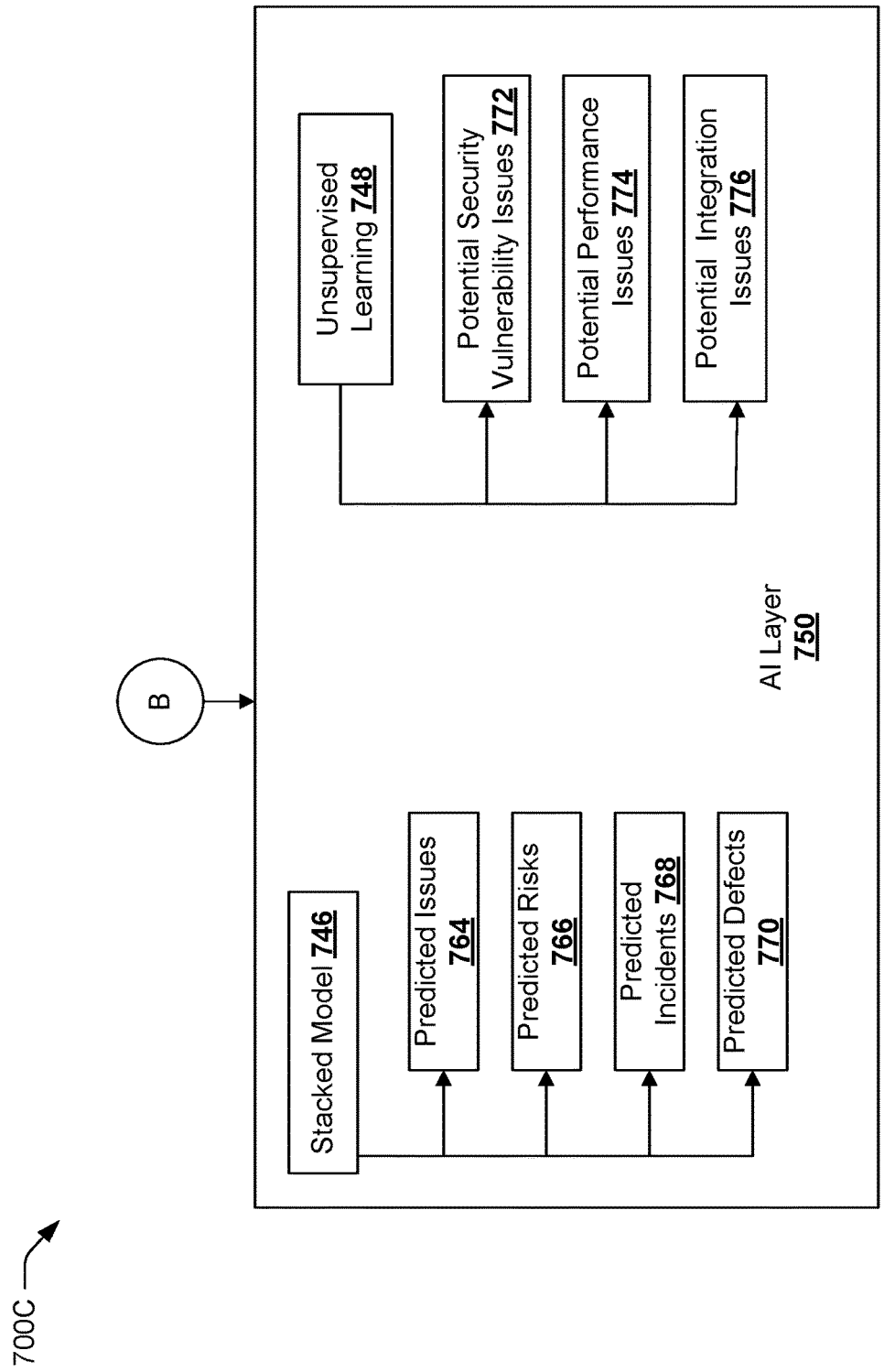

FIGS. 7A-7C illustrate flow diagrams 700A, 700B, and 700C for an artificial intelligence model deployed by the solution architecture prediction system, according to an example embodiment of the present disclosure. For the sake of brevity and technical clarity the FIGS. 7A-7C may be described together. Any of the components of the system 110 may be referred to for describing the flow diagrams 700A, 700B, and 700C. As illustrated the flow diagram 700A may include a defect layer 702, an incident layer 704, a market tool layer 706, and an existing solution layer 708. The defect layer 702 may obtain information on a set of historical defects 710, a set of historical risks 712, and a set of historical issues 714 from the historical data 206. The incident layer 704 may obtain a set of historical incidents 716 from the historical data 206. The set of historical defects 710, the set of historical risks 712, the set of historical issues 714, and the set of historical incidents 716 may be forwarded to a batch job process 718. The batch job process 718 may deploy an NLP component 752 for processing the received data. The NLP component 752 may include tools and/or techniques for implementing NLP and text mining. The batch job process 718 may also provide input to the NLP component 752.

The batch job process 718 may generate a defects search criteria 720, an incident search criteria 722, a risks search criteria 724, and an issues search criteria 726. In an example, the market tool layer 706 may use a search criteria derived from historic data to generate a market layer recommendation solution 728 and a source/target system to generate a final search criteria. The market layer recommendation solution 728 may include tools/techniques available in the market for resolving the issue 204. In an example, the market tool layer 706 may implement an extraction 730 for extracting a source system and a target system for the market layer recommendation solution 728 from either a requirement or the existing solution layer 708. The existing solution layer 708 may determine a historical solution recommendation 732.

The market layer recommendation solution 728, the extraction 730, and the historical solution recommendation 732 may be used to determine a final search criteria 734 for web scraping. The final search criteria 734 may be the search criteria set 508, which may be further used for the determination of the solution attributes as mentioned above. The system 110 may further include a scraping engine 736. The scraping engine 736 may obtain data from client documentation, and various other sources such as a technical forum for compile a set of scraped information 738. The final search criteria 734 generated based on the market layer recommendation solution 728 and the source/target system, if available, may be used by the scrapping engine 736 to obtain data from the internet to help identify the probability of historic defects/incidents occurrence. Furthermore, the final search criteria 734 generated based on the historical solution recommendation 732, may be used to identify potential integration issues, potential performance issues, potential security vulnerability issues and compatibility index from scrapped information by the scrapping engine 736.

The system 110 may further include a prediction engine 740, a security engine 742, and a compatibility engine 744. The set of scraped information 738 may be fed to the prediction engine 740, the security engine 742, and the security engine 742. The prediction engine 740 may deploy an AI layer 750 for generating a set of predicted issues 764, a set of predicted risks 766, a set of predicted incidents 768, and a set of predicted defects 770 for each of the potential solution 228. The AI layer 750 may include supervised machine learning techniques, semi-supervised machine learning techniques, and unsupervised machine learning techniques. The use of the supervised machine learning techniques, semi-supervised machine learning techniques, and unsupervised machine learning techniques together may create a robust AI-based technique for considering historical data and market data for processing the solution prediction requirement 202. The supervised machine learning techniques, semi-supervised machine learning techniques may be implemented on the historical data 206. The historical data 206 may be at least partially labeled with existing defects, risks, issues, and incidents. The supervised machine learning techniques and semi-supervised machine learning techniques may label the unlabeled historical data 206 based on the labeled historical data 206. The unsupervised machine learning techniques may be implemented to process factors such as integration issues, compatibility issues, security vulnerability issues, performance issues wherein, the data may be not be labeled.

In an example, the AI layer 750 may include a stacked model 756 that may be deployed for generating the set of predicted issues 764, the set of predicted risks 766, the set of predicted incidents 768, and the set of predicted defects 770. In an exemplary embodiment, the stacked model 756 may include a set of supervised machine learning techniques and semi-supervised machine learning techniques stacked in a specific manner for identification of the set of predicted issues 764, the set of predicted risks 766, the set of predicted incidents 768, and the set of predicted defects 770. The stacked model 756 may work on a stacking process.

The stacking process may be an efficient ensemble method in which the predictions, generated by using various machine learning techniques, may be used as inputs in a second-layer learning algorithm. This second-layer algorithm may be trained to optimally combine the model predictions to form a new set of predictions. For example, the stacking model 756 may include a first layer of supervised and semi-supervised machine learning technique such as Expectation-Maximization (EM), Support Vector Machine (SVM) technique. The EM and SVM may reduce the model variance. The first layer of supervised and semi-supervised machine learning technique may be customized to add additional weightage of about 25% predicted probability for the set of predicted issues 764, the set of predicted risks 766, the set of predicted incidents 768, and the set of predicted defects 770, as pseudo labeling may play a significant role. A supervised learning XGBoost® Classifier may form the second layer of the stacked model 756. The XGBoost® Classifier may work on the Boosting principle to reduce the model bias. Boosting may be used to decrease the model's bias. The XGBoost® may be an implementation of gradient boosted decision trees designed for speed and performance.

The stacked model 756 may further include a third layer including a supervised learning technique such as Light-GBM® tool. The LightGBM® tool may work on a boosting principle, which may focus on the prediction's errors from the second layer and help to further reduce the model bias. The customization done by stacking and boosting the AI-based tools and/or techniques may lead to an increase in predictive accuracy and reduction in model variance. The stacking of tools for the stacking model may be done using a tool such as a StackingClassifier® library. The output from the first layer of Step may be passed to the second layer. Similarly, the output from the second layer may be passed onto the third layer to provide better classification predictive accuracy for the set of predicted issues 764, the set of predicted risks 766, the set of predicted incidents 768, and the set of predicted defects 770.

In an exemplary embodiment, a defect may be determined to be "Constraint Rule Not Auto refreshed for Old products". The key features of the defect may be extracted using tools such as Term's Frequency-Inverse Document Frequency (TF-IDF) Technique, NER, dependency parsing using a library such as a Natural Language Toolkit (NLTK), spaCy® NLP Library. The extracted features may be used for modeling/training purposes using the Stacked Model 756. The Scraping Engine 736 may check the data sources such as technical forums to find technical comments similar to the defect mentioned above posted for all market layer recommended solution 728 using a Web scraping technique. The Web scraping technique may use a tool such as Beautifulsoup® library. The data pre-processing techniques such as stop words removal, lemmatization, tags, punctuation removal may be applied on scraped information 738. The scraped information 738 may be fed to the prediction engine 740 to generate the set of predicted defects 770. The set of predicted defects 770 may be predicted as probability ranging from a value zero—one (0-1). Similarly, the system 110 may determine the set of predicted issues 764, the set of predicted risks 766, and the set of predicted incidents 768.

The historical solution recommendation 732 may be based on a comparison between a new client requirement and the previous solution 210. The AI layer 750 may compare the key features for the defects, the risks, the incidents, and the issues for each previous solution 210 included in the existing solution layer 708. For example, there may be a solution A and a solution B in the existing solution layer 708. The AI layer 750 may implement a Cosine Similarity technique on the extracted features of the solution A and the solution B to determine a requirement similarity parameter for each of the solution A and the solution B with respect to the new client requirement. The requirement similarity parameter may be, for example, a percentage similarity between the new client requirement and the previous solution 210. The features of the solution A and the solution B may be extracted using various techniques such as TF-IDF Technique, NER, dependency parsing using a library such as NLTK, spaCy® NLP Library, and the like.

Furthermore, corresponding defects, incidents, risks, issues with respect to a one of a high occurrence level category, a medium occurrence level category, and a low occurrence level category for each of the previous solutions 210, such as above mentioned solutions A and B, may be extracted from the defects layer 702 and the incident layer 704. For example, the requirement similarity percentage for the solution A may be 90% and the requirement similarity percentage for the solution B may be 80%. Also, each of the categories may be assigned predefined weights by the AI layer 750, for example, the high occurrence level category may be assigned a weightage value as five "5"; the medium occurrence level category may be assigned a weightage value as three "3"; and the low occurrence level category may be assigned a weightage value as one "1". The AI layer 750 may determine a final score for a solution based on the following equation:

$$\begin{aligned}\text{Final score for a previous solution} = \quad & \text{Equation 6} \\ \text{weightage points of high occurrence level} \\ \text{category} * \text{Sum(no. of high category defects} + \\ \text{No. of high category incidents} + \text{No. of high} \\ \text{category risks} + \text{No. of high category issues)} + \\ \text{weightage points of medium occurrence level} \\ \text{category} * \text{Sum (no. of medium category defects} + \\ \text{No. of medium category incidents} + \\ \text{No. of medium category risks} + \\ \text{No. of medium category issues)} + \\ \text{weightage points of low occurrence level} \\ \text{category} * \text{Sum(no. of low category defects} + \\ \text{No. of low category incidents} + \text{No. of low} \\ \text{category risks} + \text{No. of low category issues)}\end{aligned}$$

Assuming the solution A has one defect in high category, one incident in medium category, one risk in low category, and one issue in low category, then the final score for a solution may be determined using equation 6 as:

Final Score(Solution $A$)=5*Sum(1+0+0+0)+3*Sum (0+1+0+0)+1*Sum(0+0+1+1)=10

Similarly, the final score each of the previous solution may be computed.

Further, the AI layer 750 may calculate the requirement fulfillment index 530 for each previous solution 210. The requirement fulfillment index 530 for the previous solution 210 may be determined by the following equation:

Requirement Fulfillment Index=Requirement Similarity Percentage−Score Reduction based on Final Score     Equation 7 where, the score reduction may be pre-configured into the AI layer 750. In an example, the score reduction may be automatically modified by the AI layer 750 based on the solution prediction requirement 202. An exemplary score reduction table may be presented below:

| Final Points for the previous solution | Score Reduction |
|---|---|
| <=5 | 5 |
| >5 to <15 | 10 |
| >15 to <20 | 15 |
| >20 to <30 | 20 |
| >30 to <40 | 25 |
| >40 to <50 | 30 |
| >50 to <60 | 35 |
| >60 | 50 |

Referring to example above, the requirement fulfillment index for solution A may be determined using equation 7 as below:

Requirement Fulfillment Index(Solution $A$)=90−10=80

Similarly, the requirement fulfillment index for each previous solution may be determined and accordingly, the historical evolution solution matrix may be determined using the requirement fulfillment index for each previous solution, which may later be used to determine the credibility score.

The prediction engine 740, the security engine 742, and the compatibility engine 744 may implement an unsupervised learning technique 748 from the AI layer 750 to determine a compatibility index 754, a set of potential security vulnerability issues 772, a set of potential performance issues 774, and a set of potential integration issues 776. In an exemplary embodiment, the unsupervised learning technique 748 may include the implementation of a Latent Dirichlet Allocation (LDA) technique for determining the compatibility index 754, the set of potential security vulnerability issues 772, the set of potential performance issues 774, and the set of potential integration issues 776.

The compatibility index 754 may be determined for the previous solution 210 and the potential solution 228. The compatibility index 754 may be used to display the compatibility index of solutions with respect to a software/hardware and an ecosystem (be it source/target source system). The compatibility index 754 may be used to display the compatibility index of solutions with respect to the infrastructure of an organization. The scraping engine 736 may check the data source to find the technical comments posted for the previous solution 210 and the potential solution 228 with respect to the infrastructure of an organization. The scraping engine 736 may use techniques such as Web scraping and Python filtering to find the technical comments. The scraping engine 736 may implement various data pre-processing techniques such as Stop words removal, Lemmatization, tags, punctuation removal on scraped information 738 related to the technical comments associated with compatibility. Thereafter, the unsupervised learning technique 748 may apply a Cosine Similarity technique, a Python regular expression and filtering techniques to calculate the compatibility score in the range of 0.1 to 1. In an example, 1 may represent good compatibility.

The set of potential integration issues 776 may be used to display a list of various potential integration issues that are encountered by other users who have implemented either of the previous solution 210 and the potential solution 228. The set of potential integration issues 776 may be excluding the historical defects 710, the historical risks 712, the historical issues 714, and the historical incidents 716 with respect to an integration perspective. The scraping engine 736 may check the data sources to find the technical comments posted for the previous solution 210 and the potential solution 228 excluding the historical defects 710, the historical risks 712, the historical issues 714, and the historical incidents 716 with respect to the integration perspective. The scraping engine 736 may use Web scraping and Python filtering technique to find the technical comments. The scraping engine 736 may implement various data pre-processing techniques such as Stop words removal, Lemmatization, tags, punctuation removal on scraped information 738 related to the technical comments associated with integration. Thereafter, the unsupervised learning technique 748 may create a Document-term matrix using a count vectorizer followed by applying a topic modeling algorithm such as the LDA to provide the output including a list of integration issues and its corresponding probability (0 to 1). In an example, a value of "0.5" may represent a probability of 50%, a value of "1" may represent a probability of 100%, a value of "0" may represent a zero probability.

The potential performance issues 774 may be used to display a list of various potential performance issues that are encountered by other users who have implemented either of the previous solution 210 and the potential solution 228. The potential performance issues 774 may be excluding the historical defects 710, the historical risks 712, the historical issues 714, and the historical incidents 716 with respect to a performance perspective. The scraping engine 736 may check the data sources to find the technical comments posted for the previous solution 210 and the potential solution 228 excluding the historical defects 710, the historical risks 712, the historical issues 714, and the historical incidents 716 with respect to the performance perspective. The scraping engine 736 may use Web scraping and Python filtering technique to find the technical comments. The scraping engine 736 may implement various data pre-processing techniques such as Stop words removal, Lemmatization, tags, punctuation removal on scraped information 738 related to the technical comments associated with performance. Thereafter, the unsupervised learning technique 748 may create a Document-term matrix using a count vectorizer followed by applying a topic modeling algorithm such as the LDA to provide the output including a list of performance issues and its corresponding probability (0 to 1). In an example, a value of "0.5" may represent a probability of 50%, a value of "1" may represent a probability of 100%, a value of "0" may represent a zero probability.

The potential security vulnerability issues 772 may be used to display a list of various potential security vulnerability issues that are encountered by other users who have implemented either of the previous solution 210 and the potential solution 228. The potential security vulnerability issues 772 may be excluding the historical defects 710, the historical risks 712, the historical issues 714, and the historical incidents 716 with respect to a security vulnerability perspective. The scraping engine 736 may check the data sources to find the technical comments posted for the previous solution 210 and the potential solution 228 excluding the historical defects 710, the historical risks 712, the historical issues 714, and the historical incidents 716 with respect to the security vulnerability perspective. The scraping engine 736 may use Web scraping and Python filtering technique to find the technical comments. The scraping engine 736 may implement various data pre-processing techniques such as Stop words removal, Lemmatization, tags, punctuation removal on scraped information 738 related to the technical comments associated with a security vulnerability. Thereafter, the unsupervised learning technique 748 may create a Document-term matrix using a count vectorizer followed by applying a topic modeling algorithm such as the LDA to provide the output including a list of security vulnerability issues and its corresponding probability (0 to 1). In an example, a value of "0.5" may represent a probability of 50%, a value of "1" may represent a probability of 100%, and a value of "0" may represent a zero probability.

As illustrated in FIG. 7B, the system 110 may include a scoring engine 756. As mentioned by way of Equation 2 and Equation 4 the AI layer 750 may determine the compatibility index 754, the potential security vulnerability issues 772, the potential performance issues 774, the potential integration issues 776, the predicted issues 764, the predicted risks 766, the predicted incidents 768, the predicted defects 770, and the requirement fulfillment index for the potential solution 228. As mentioned by way of Equation 1 and Equation 3 the AI layer 750 may determine the compatibility index 754, the potential security vulnerability issues 772, the potential performance issues 774, and the potential integration issues 776 for the previous solution 210. As mentioned by way of Equation 5, Equation 6, and Equation 7 the AI layer 750 may determine the requirement fulfillment index for each of the previous solution 210 and the potential solution 228.

The historical solution recommendation 732 may be generated based on the credibility score 234 of the previous solution 210. The market layer recommendation solution 728 may be generated based on the credibility score 234 of the potential solution 228. The credibility score 234 for the potential solution 228 and the previous solution 210 may be determined by the scoring engine 756. The system 110 may implement a check 758 to check if any of the solutions may have a similar credibility score 234. In an example, the results of the check 758 may be affirmative, then the system 110 may implement an upvote 760. The upvote 760 may include referring to the upvote library 242 and elevating the solution rank 240 for one of the solutions for resolving a conflict in the solution rank. In an example, the result to the check 758 may be negative, then the system 110 may implement a display 762, wherein the results from the scoring engine may be displayed to a user of the system 110. In an example, the display 762 may present the solution prediction data 236 to the user of the system.

FIG. 8 illustrates a solution prediction data 800 generated by the solution architecture prediction system 110, according to an example embodiment of the present disclosure. Any of the components of the system 110 may be referred to for describing the solution prediction data 800. The solution prediction data 800 may be the solution prediction data 236. The solution prediction data 800 may include a table 802 comprising the hybrid AI recommendation 436 created by amalgamating the market data based AI recommendation 432, and the historical data based AI recommendation 434. Table 802 may illustrate a solution rank 804. The solution rank 804 may be the solution rank 240. Further, the table 802 may include a conflict upvote reason column 806. The conflict upvote reason column 806 may be populated from the upvote library 242. As illustrated in table 802, the solution with solution rank 1 and the solution with the solution rank 2 may have the credibility score 236 as 59. The AI model 218 may provide a higher rank to an already implemented solution in such a case, as compared to a new solution. Further, the solution prediction data 800 interface may include an option box 808, and a view box 810. The option box 808 may provide various data sorting options for the solution prediction data 800. The view box 812 may provide various viewing filters to a user for viewing the solution prediction data 800.

Figure 9:
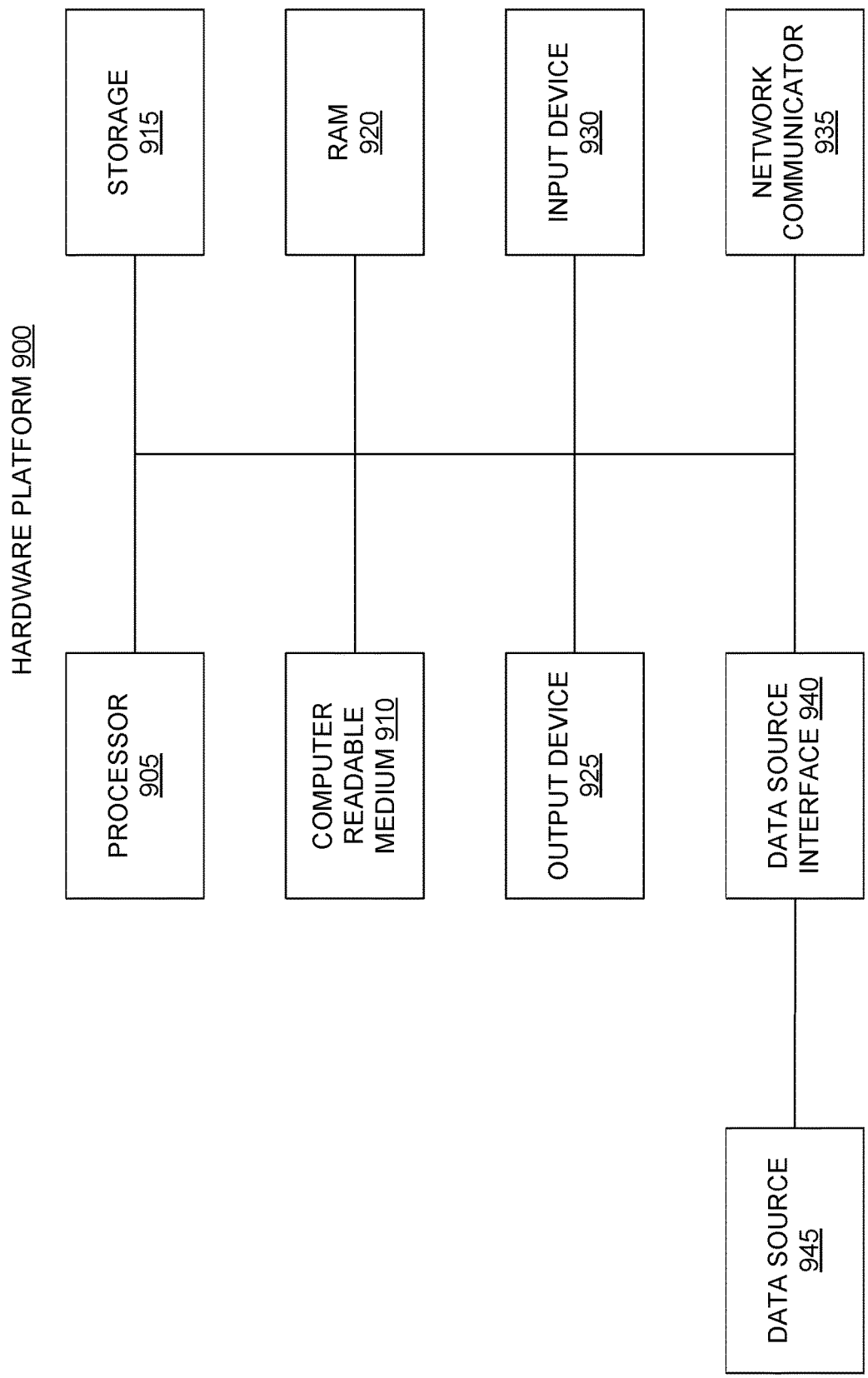
FIG. 9 illustrates a hardware platform for the implementation of the solution architecture prediction system, according to an example embodiment of the present disclosure.

FIG. 9 illustrates a hardware platform 900 for the implementation of the system 90, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 900. The hardware platform 900 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

The hardware platform 900 may be a computer system 900 that may be used with the examples described herein. The computer system 900 may represent a computational platform that includes components that may be in a server or another computer system. The computer system 900 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 900 may include a processor 905 that executes software instructions or code stored on a non-transitory computer-readable storage medium 910 to perform methods of the present disclosure. The software code includes, for example, instructions to gather data and documents and analyze documents. In an example, the data extractor 130, the data analyzer 140, and the modeler 150 may be software codes or components performing these steps.

The instructions on the computer-readable storage medium 910 are read and stored the instructions in storage 99 or in random access memory (RAM) 920. The storage 99 provides a large space for keeping static data where at least some instructions could be stored for later execution. The stored instructions may be further compiled to generate other representations of the instructions and dynamically stored in the RAM 920. The processor 905 reads instructions from the RAM 920 and performs actions as instructed.

The computer system 900 further includes an output device 925 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 900 further includes input device 930 to provide a user or another device with mechanisms for entering data and/or otherwise interact with the computer system 900. The input device may include, for example, a keyboard, a keypad, a mouse, or a touchscreen. Each of these output devices 925 and input devices 930 could be joined by one or more additional peripherals. In an example, the output device 925 may be used to display the results of the benefit prediction requirement 202.

A network communicator 935 may be provided to connect the computer system 900 to a network and in turn to other devices connected to the network including other clients, servers, data stores, and interfaces, for instance. A network communicator 935 may include, for example, a network adapter such as a LAN adapter or a wireless adapter. The computer system 900 includes a data source interface 940 to access data source 945. A data source is an information resource. As an example, a database of exceptions and rules may be a data source. Moreover, knowledge repositories and curated data may be other examples of data sources.

Figure 10B:
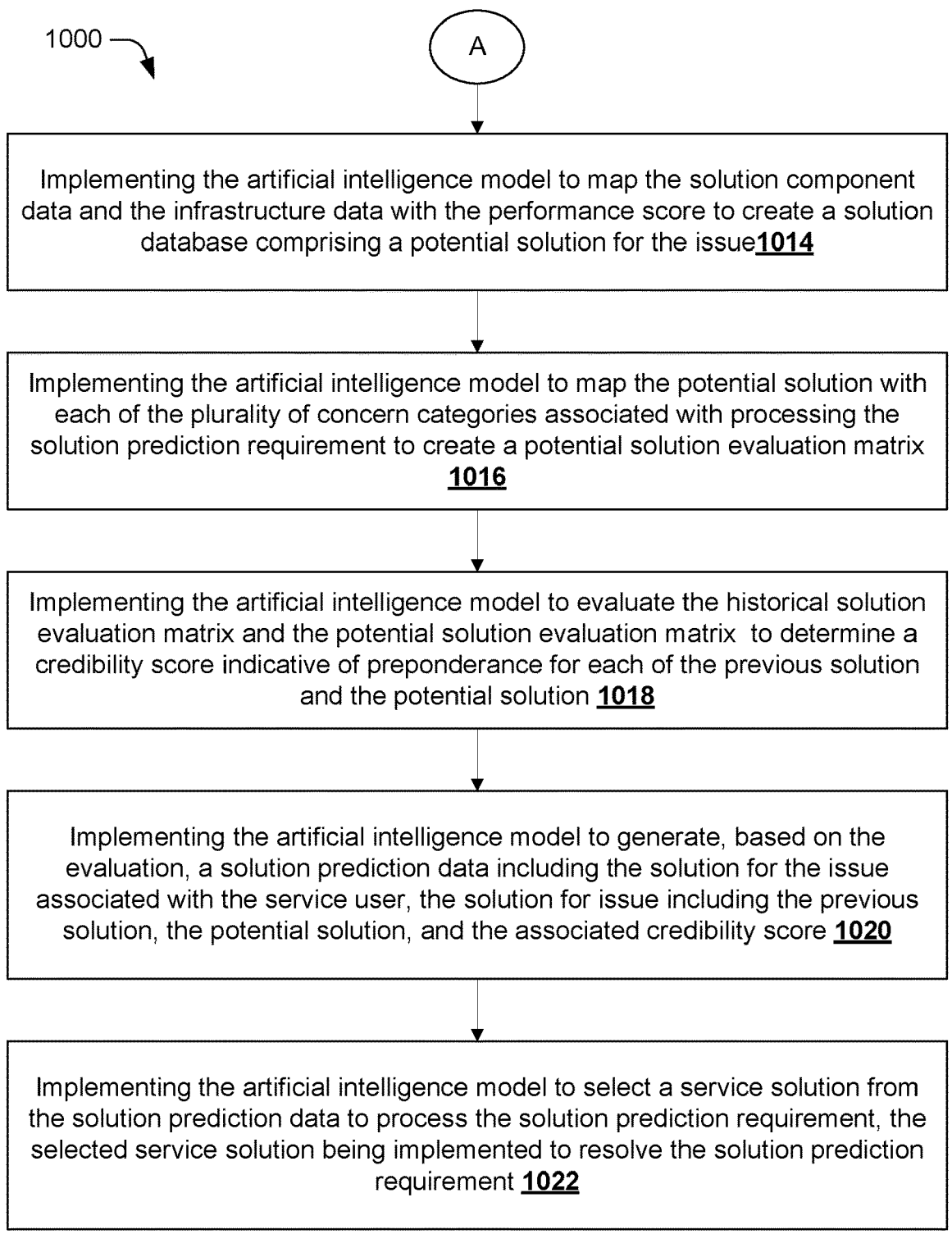

FIGS. 10A and 10B illustrate a process flowchart for baggage weight prediction using the solution prediction system 110, according to an example embodiment of the present disclosure. It should be understood that method steps are shown here for reference only and other combinations of the steps may be possible. Further, the method 1000 may contain some steps in addition to the steps shown in FIG. 10. For the sake of brevity, construction, and operational features of the system 110 which are explained in detail in the description of FIGS. 1-9 are not explained in detail in the description of FIGS. 10A and 10B. The method 1000 may be performed by a component of the system 110.

At block 1002, the solution prediction requirement may be received associated with a service provided to a user. The solution prediction requirement may be related to the solution to the issue pertaining to the service.

At block 1004, historical data and infrastructure data pertaining to the processing of the solution prediction requirement may be obtained from the data source. The historical data may include information regarding the previous solution for resolving the issue. The infrastructure data may include infrastructure information associated with processing the solution prediction requirement.

At block 1006, the artificial intelligence component may be implemented to determine a requirement fulfillment index for each of the previous solution associated with processing the solution prediction requirement to create a historical solution evaluation matrix.

At block 1008, the AI model may be implemented to identify, from the data source, the plurality of solution components preponderant to deriving the solution associated with the issue At block 1010, the AI model may be implemented to may obtain solution component data from the data source. The solution component data may include information pertaining to each of the plurality of solution components At block 1012, the AI model may be implemented to map solution component data with each of the pre-existing plurality of solution attributes to determine the performance score indicative of the performance of each of the plurality of solution components associated with each of the solution attributes. In an example, the solution attributes 224 include at least one of an infrastructure index, a user experience index, a popularity index, a scalability index, a community support index, and a requirement fulfillment index.

At block 1014, the AI model may be implemented to map the solution component data and the infrastructure data with the performance score to create the solution database comprising the potential solution for the issue.

At block 1016, the AI model may be implemented to map the potential solution with each of the plurality of concern categories associated with processing the solution prediction requirement to create the potential solution evaluation matrix At block 1018, the AI model may be implemented to evaluate the historical solution evaluation matrix and the potential solution evaluation matrix to determine the credibility score indicative of preponderance for each of the previous solution and the potential solution.

At block 1020, the AI model may be implemented to generate the solution prediction data including the solution for the issue associated with the service user based on the evaluation. The solution for the issue includes the previous solution, the potential solution, and the associated credibility score.

At block 1022, the AI model may be implemented to select a service solution from the solution prediction data to process the solution prediction requirement, the selected service solution being implemented to resolve the solution prediction requirement.

In accordance with various embodiment of the present disclosure, the method 1000 may further include obtaining historical data 206 including information associated with at least one of a defect, an incident, a concern, and a risk associated with the previous solution 210. Further, a requirement similarity parameter for the solution prediction requirement and the previous solution may be computed. In an example, the requirement similarity parameter may be in form of a percentage. The requirement similarity parameter may be based on feature extraction using feature extraction techniques, and implementation of similarity determining techniques, such as Cosine similarity techniques to determine requirement similarity parameter. A number of occurrences of at least one of the defect, the incident, the concern, the risk corresponding to the requirement similarity parameter for each occurrence level category may also be determined. The occurrence level category may include at least one a high occurrence level category, a medium occurrence level category, and a low occurrence level category. Based on the number of occurrences of the defect, the incident, the concern, the risk for each occurrence level category, and a weightage value assigned to the each occurrence level category, a final score for the previous solution may be determined. A requirement fulfillment index for the previous solution may be determined, based on the requirement similarity parameter and a corresponding predefined score reduction associated with the final score. The historical evolution solution matrix may be based on the requirement fulfillment index of each of the previous solution.

The method 1000 may further include obtaining solution component data 222 including information associated with at least one of a component defect, a component incident, a component concern, and a component risk associated with the potential solution 228. The method 1000 may further include determining an occurrence probability for a second event associated with one of the component defect, the component incident, the component concern, and the component risk based on implementation of the artificial intelligence model on the solution component data. The occurrence probability for the second event may be mapped with the concern categories 220 to create the potential solution evaluation matrix 232.

The method 1000 may further include mapping information from the historical solution evaluation matrix 214 and the potential solution evaluation matrix 232 with at least one of the infrastructure index, the user experience index, the popularity index, the scalability index, the community support index, and the requirement fulfillment index to create an upvote library. The solution rank 240 may be assigned to each of the previous solution 210 and the potential solution 228 in the solution prediction data 236, based on respective credibility scores 234. The method 1000 may include comparing the credibility score 234 for each of the solution in the solution prediction data 236 to identify a conflicting solution rank in the solution prediction data. The conflicting solution rank may indicate a similar credibility score for the previous solution 210 and the potential solution 228. The method 1000 may include elevating the solution rank 240 for at least one solution associated with the conflicting solution rank, based on comparing the solution associated with the conflicting solution rank with the upvote library 242.

The method 1000 may be practiced over a non-transitory computer-readable medium including machine readable instructions that are executable by a processor.

The present disclosure provides an efficient solution prediction system that may account for the various factors mentioned above, amongst others. The present disclosure provides for predicting a solution architecture for creating and implementing the solution that may include creating an AI aided collective knowledge base to provide the best solution architecture for a given client requirement. The collective knowledge base may facilitate the creation and curation of the solution for catering to unique client requirements across various industrial sectors. Furthermore, the solution architecture prediction may determine an optimal solution architecture with lesser computational resource consumption and facilitate the creation and implementation of the solutions efficiently and effectively. Furthermore, the present disclosure provides for recommending a solution, based on not only the previously available tools and techniques, but also the newly available tools, for which historical data may not be available yet. The AI model may predict potential challenges, defects, and usage of the new tools and techniques, and factor in these aspects while recommending a solution.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth with respect to illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a memory storing executable instructions, which, when executed by the processor cause to:
   receive a solution prediction requirement associated with a service provided to a user, the solution prediction requirement being related to a solution to an issue pertaining to the service;
   obtain historical data and infrastructure data pertaining to processing of the solution prediction requirement from a data source, the historical data comprising information regarding a previous solution for resolving the issue, and the infrastructure data comprising infrastructure information associated with processing the solution prediction requirement;
   implement an artificial intelligence component to determine a requirement fulfillment index for the previous solution associated with processing the solution prediction requirement to create a historical solution evaluation matrix;
   identify, from the data source, a plurality of solution components preponderant to deriving the solution associated with the issue;
   obtain solution component data from the data source, the solution component data comprising information pertaining to each of the plurality of solution components;
   map solution component data with each of a pre-existing plurality of solution attributes to determine a performance score indicative of a performance of each of the plurality of solution components associated with each of the solution attributes;
   map the solution component data and the infrastructure data with the performance score to create a solution database comprising a potential solution for the issue, the potential solution being based on a technical solution available in market;

map the potential solution with each of a plurality of concern categories associated with processing the solution prediction requirement to create a potential solution evaluation matrix;

evaluate the historical solution evaluation matrix and the potential solution evaluation matrix to determine a credibility score indicative of preponderance for each of the previous solution and the potential solution;

based on the evaluation, generate solution prediction data including the solution for the issue associated with the service user by deploying a stacking model, the stacking model comprising a first layer of supervised and semi-supervised machine learning technique to reduce model variance of the stacking model, and a second layer of supervised machine learning technique to reduce model bias of the stacking model, the solution for issue including the previous solution, the potential solution, and the associated credibility score; and select a service solution from the solution prediction data to process the solution prediction requirement, the selected service solution being implemented to resolve the solution prediction requirement.

2. The system as claimed in claim 1, wherein the processor is to:

obtain the historical data including information associated with at least one of a defect, an incident, a concern, and a risk associated with the previous solution;

compute a requirement similarity parameter for the solution prediction requirement and the previous solution;

determine a number of occurrences of at least one of the defect, the incident, the concern, the risk corresponding to the requirement similarity parameter for each occurrence level category, the occurrence level category including at least one a high occurrence level category, a medium occurrence level category, and a low occurrence level category;

determine a final score for the previous solution based on the number of occurrences of the defect, the incident, the concern, the risk for each occurrence level category, and a weightage value assigned to the each occurrence level category; and compute the requirement fulfillment index for the previous solution, based on the requirement similarity parameter and a corresponding predefined score reduction associated with the final score, the historical evolution solution matrix being based on the requirement fulfillment index.

3. The system as claimed in claim 1, wherein the processor is to:

obtain solution component data including information associated with at least one of a component defect, a component incident, a component concern, and a component risk associated with the potential solution; and determine an occurrence probability for a second event associated with one of the component defect, the component incident, the component concern, and the component risk based on implementation of the artificial intelligence model on the solution component data; and map the occurrence probability for the second event with the plurality of concern categories to create the potential solution evaluation matrix.

4. The system as claimed in claim 1, wherein the pre-existing plurality of solution attributes include at least one of an infrastructure index, a user experience index, a popularity index, a scalability index, a community support index, and the requirement fulfillment index.

5. The system as claimed in claim 4, wherein the processor is to map information from the historical solution evaluation matrix and the potential solution evaluation matrix with at least one of the infrastructure index, the user experience index, the popularity index, the scalability index, the community support index, and the requirement fulfillment index to create an upvote library.

6. The system as claimed in claim 5, wherein the processor is to assign a solution rank to each of the previous solution and the solution prediction data, based on respective credibility scores.

7. The system as claimed in claim 6, wherein the processor is to:

compare the credibility score for each of the solution in the solution prediction data to identify a conflicting solution rank in the solution prediction data, the conflicting solution rank indicative of a similar credibility score for the previous solution and the potential solution; and elevate the solution rank for at least one solution associated with the conflicting solution. rank, based on comparing the solution associated with the conflicting solution rank with the upvote library.

8. A method comprising:

receiving, by a processor, a solution prediction requirement associated with a service provided to a user, the solution prediction requirement being related to a solution to an issue pertaining to the service;

obtaining, by the processor, historical data and infrastructure data pertaining to processing of the solution prediction requirement from a data source, the historical data comprising information regarding a previous solution for resolving the issue, and the infrastructure data. comprising infrastructure information associated with processing the solution prediction requirement;

implementing, by the processor, an artificial intelligence component to determine a requirement fulfillment index for the previous solution associated with processing the solution prediction requirement to create a historical solution. evaluation matrix; and implementing, by the processor, an artificial intelligence model to:

identify, from the data source, a plurality of solution components preponderant to deriving the solution associated with the issue;

obtain solution component data from the data source, the solution component data comprising information pertaining to each of the plurality of solution components;

map solution component data with each of a pre-existing plurality of solution attributes to determine a performance score indicative of a performance of each of the plurality of solution components associated with each of the solution attributes;

map the solution component data and the infrastructure data with e perfomiance score to create a solution database comprising a potential solution for the issue, the potential solution being based on a technical solution available in market;

map the potential solution with each of a plurality of concern categories associated with processing the solution prediction requirement to create a potential solution evaluation matrix;

evaluate the historical solution evaluation matrix and the potential solution evaluation matrix to determine a credibility score indicative of preponderance for each of the previous solution and the potential solution;

based on the evaluation, generate solution prediction data including the solution for the issue associated with the service user by deploying a stacking model, the stacking model comprising, a first layer of supervised and semi-supervised machine learning technique to reduce model variance of the stacking model, and a second layer of supervised machine learning technique to reduce model bias of the stacking model, the solution for issue including the previous solution, the potential solution, and the associated credibility score; and select a service solution from the solution prediction data to process the solution prediction requirement, the selected service solution being implemented to resolve the solution prediction requirement.

9. The method as claimed in claim 8, wherein the method further comprises:

obtaining the historical data including information associated with at least one of a defect, an incident, a concern, and a risk associated with the previous solution;

computing a requirement similarity parameter for the solution prediction requirement and the previous solution;

determining a number of occurrences of at least one of the defect, the incident, the concern, the risk corresponding to the requirement similarity parameter for each occurrence level category, the occurrence level category including at least one a high occurrence level category, a medium occurrence level category, and a low occurrence level category;

determining a final score for the previous solution based on the number of occurrences of the defect, the incident, the concern, the risk for each occurrence level category, and a weightage value assigned to the each occurrence level category; and computing the requirement fulfillment index for the previous solution, based on the requirement. similarity parameter and a corresponding predefined score reduction associated with the final score, the historical evolution solution matrix being based on the requirement fulfillment index.

10. The method as claimed in claim 8, wherein the method further comprises:

obtaining, by the processor, the solution component data including information associated with at least one of a component defect, a component incident, a component concern, and a component risk associated with the potential solution; and determining, by the processor, an occurrence probability for a second event associated with one of the component defect, the component incident, the component concern, and the component risk based on implementation of the artificial intelligence model on the solution component data and mapping, by the processor, the occurrence probability for the second event with the plurality of concern categories to create the potential solution evaluation matrix.

11. The method as claimed in claim 8, wherein the pre-existing plurality of solution attributes include at least one of an infrastructure index, a user experience index, a popularity index, a scalability index, a community support index, and a requirement fulfillment index.

12. The method as claimed in claim 11, wherein the method further comprises mapping, by the processor, information from the historical solution evaluation matrix and the potential solution evaluation matrix with at least one of the infrastructure index, the user experience index, the popularity index, the scalability index, the community support index, and the requirement fulfillment index to create an upvote library.

13. The method as claimed in claim 12, wherein the method further comprises assigning, by the processor, a solution rank to each of the previous solution and the potential solution in the solution prediction data, based on respective credibility scores.

14. The method as claimed in claim 13, wherein the method further comprises:

comparing, by the processor, the credibility score for each of the solution in the solution prediction data to identify a conflicting solution rank in the solution prediction data, the conflicting solution rank indicative of a similar credibility score for the previous solution and the potential solution; and elevating, by the processor, the solution rank for at least one solution associated with the conflicting solution rank, based on comparing the solution associated with the conflicting solution rank with the upvote library.

15. A non-transitory computer-readable medium including machine readable instructions that are executable by a processor to:

receive a solution prediction requirement associated with a service provided to a user, the solution prediction requirement being related to a solution to an issue pertaining to the service;

obtain historical data and infrastructure data pertaining to processing of the solution. prediction requirement from a data source, the historical data comprising information regarding a previous solution for resolving the issue, and the infrastructure data comprising infrastructure information associated with processing the solution prediction requirement;

implement an artificial intelligence component to determine a requirement fulfillment index for the previous solution associated with processing the solution prediction requirement to create a historical solution evaluation matrix; and implement an artificial intelligence model to:

identify, from the data source, a plurality of solution components preponderant to deriving the solution associated with the issue;

obtain solution component data from the data source, the solution component data comprising information pertaining to each of the plurality of solution components;

map solution component data with each of a pre-existing plurality of solution attributes to determine a performance score indicative of a performance of each of the plurality of solution components associated with each of the solution attributes;

map the solution component data and the infrastructure data with the performance score to create a solution database comprising a potential solution for the issue, the potential solution being based on a technical solution available in market;

map the potential solution with each of a plurality of concern categories associated with processing the solution prediction requirement to create a potential solution evaluation. matrix:

evaluate the historical solution evaluation matrix and the potential solution evaluation matrix to determine a credibility score indicative of preponderance for each of the previous solution and the potential solution;

based on the evaluation, generate solution prediction data including the solution for the issue associated with the service user by deploying a stacking model, the stacking model comprising a first layer of supervised and semi-supervised machine learning technique to reduce model variance of the stacking model, and a second layer of supervised machine learning technique to reduce model bias of the stacking model, the solution for issue including the previous solution, the potential solution, and the associated credibility score; and select a service solution from the solution prediction data to process the solution prediction requirement, the selected service solution being implemented to resolve the solution prediction requirement.

16. The non-transitory computer-readable medium of claim 15, wherein the processor is to:

obtain the historical data including information associated with at least one of a defect, an incident, a concern, and a risk associated with the previous solution;

compute a requirement similarity parameter for the solution prediction requirement and the previous solution;

determine a number of occurrences of at least one of the defect, the incident, the concern, the risk corresponding to the requirement similarity parameter for each occurrence level category, the occurrence level category including at least one a high occurrence level category, a medium occurrence level category, and a low occurrence level category;

determine a final score for the previous solution based on the number of occurrences of the defect, the incident, the concern, the risk for each occurrence level category, and a weightage value assigned to the each occurrence level category;

compute the requirement fulfillment index for the previous solution, based on the requirement similarity parameter and a corresponding predefined score reduction associated. with the final score, the historical evolution solution matrix being based on the requirement fulfillment index.

17. The non-transitory computer-readable medium of claim 15, wherein the processor is to:

obtain the solution component data including information associated with at least one of a component defect, a component incident, a component concern, and a component risk associated with the potential solution; and determine an occurrence probability for a second event associated with one of the component defect, the component incident, the component concern, and the component risk based on implementation of the artificial intelligence model on the solution component data; and map the occurrence probability for the second event with the plurality of concern categories to create the potential solution evaluation matrix.

18. The non-transitory computer-readable medium of claim 15, wherein the processor is to pre-existing plurality of solution attributes include at least one of an infrastructure index, a user experience index, a popularity index, a scalability index, a community support index, and a requirement fulfillment index.

19. The non-transitory computer-readable medium of claim 18, wherein the processor is to:

map information from the historical solution evaluation matrix and the potential solution evaluation matrix with at least one of the infrastructure index, the user experience index, the popularity index, the scalability index, the community support index, and the requirement fulfillment index to create an upvote library; and assign a solution rank to each of the previous solution and the potential solution in the solution prediction data, based on respective credibility scores.

20. The non-transitory computer-readable medium of claim 19, wherein the processor is to:

compare the credibility score for each of the solution in the solution prediction data to identify a conflicting solution rank in the solution prediction data, the conflicting solution rank indicative of a similar credibility score for the previous solution and the potential solution; and elevate the solution rank for at least one solution associated with the conflicting solution rank, based on comparing the solution associated with the conflicting solution rank with the upvote library.

* * * * *